United States Patent
Hasegawa

(10) Patent No.: US 10,413,982 B2
(45) Date of Patent: Sep. 17, 2019

(54) NUMERICAL CONTROL APPARATUS OF A MACHINE TOOL FOR MACHINING A WORKPIECE BY A CUTTING TOOL ALONG MACHINING PATH INCLUDING AN OFFSET

(71) Applicant: FANUC CORPORATION, Yamanashi (JP)

(72) Inventor: Yasuo Hasegawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 32 days.

(21) Appl. No.: 15/635,866

(22) Filed: Jun. 28, 2017

(65) Prior Publication Data

US 2017/0297129 A1    Oct. 19, 2017

Related U.S. Application Data

(62) Division of application No. 14/517,208, filed on Oct. 17, 2014, now Pat. No. 9,821,394.

(30) Foreign Application Priority Data

Oct. 18, 2013    (JP) .................................. 2013-217694

(51) Int. Cl.
   *B23H 7/06*    (2006.01)
   *G05B 19/18*    (2006.01)
   (Continued)

(52) U.S. Cl.
   CPC .................. *B23H 1/02* (2013.01); *B23H 7/06* (2013.01); *G05B 19/182* (2013.01);
   (Continued)

(58) Field of Classification Search
   None
   See application file for complete search history.

(56) References Cited

U.S. PATENT DOCUMENTS 4,074,349 A * 2/1978 Ueda ................ G05B 19/40931
                                                         700/176
4,355,223 A * 10/1982 Inoue ..................... B23H 7/065
                                                         219/69.12

(Continued)

FOREIGN PATENT DOCUMENTS

CN    101602130 A    12/2009
CN    101791727 A    8/2010

(Continued)

OTHER PUBLICATIONS

Decision to Grant a Patent dated Mar. 17, 2015, corresponding to Japanese patent application No. 2013-217694.

(Continued)

*Primary Examiner* — Ramesh B Patel
(74) *Attorney, Agent, or Firm* — Hauptman Ham, LLP

(57) ABSTRACT

In wire-electrical discharge machine and a numerical control apparatus thereof and a numerical control apparatus for controlling a machine tool, optional minute blocks are automatically created in front of and behind a connecting point, which is a joint of a block to which an offset command is instructed, and an offset value is exchanged between the minute blocks so that a correct offset value is set in a desired block.

3 Claims, 20 Drawing Sheets

(51) Int. Cl.
  *B23H 1/02* (2006.01)
  *G05B 19/4093* (2006.01)
  *B23H 7/00* (2006.01)
  *B23H 7/02* (2006.01)

(52) U.S. Cl.
  CPC .......... *G05B 19/40937* (2013.01); *B23H 7/00* (2013.01); *B23H 7/02* (2013.01); *G05B 2219/45043* (2013.01); *G05B 2219/45221* (2013.01); *G05B 2219/50283* (2013.01); *G05B 2219/50331* (2013.01); *G05B 2219/50335* (2013.01); *G05B 2219/50336* (2013.01); *Y02P 90/265* (2015.11)

(56) References Cited

U.S. PATENT DOCUMENTS

| | | | | |
|---|---|---|---|---|
| 4,467,166 | A * | 8/1984 | Gamo | B23H 7/065 219/69.12 |
| 5,043,551 | A * | 8/1991 | Watanabe | B23H 7/065 219/69.12 |
| 5,047,606 | A * | 9/1991 | Hiramine | B23H 7/065 219/69.12 |
| 5,115,400 | A * | 5/1992 | Watanabe | G05B 19/4097 700/182 |
| 5,177,689 | A * | 1/1993 | Kinasi | G05B 19/4097 700/162 |
| 5,243,165 | A * | 9/1993 | Hosaka | B23H 7/02 219/69.12 |
| 5,453,592 | A * | 9/1995 | Takeuchi | B23H 7/04 219/69.12 |
| 5,763,843 | A * | 6/1998 | Yuzawa | B23H 7/20 200/344 |
| 6,627,835 | B1 * | 9/2003 | Chung | B23H 7/02 219/121.72 |
| 6,791,055 | B1 | 9/2004 | Katougi | |
| 7,371,989 | B2 * | 5/2008 | Miyajima | B23H 7/065 219/69.12 |
| 9,367,047 | B2 | 6/2016 | Yamane et al. | |
| 9,381,589 | B2 | 7/2016 | Arakawa et al. | |
| 9,821,394 | B2 * | 11/2017 | Hasegawa | B23H 1/02 |
| 2004/0084419 | A1 * | 5/2004 | Kato | B23H 7/065 219/69.12 |
| 2007/0068905 | A1 * | 3/2007 | Miyajima | B23H 7/065 219/69.12 |
| 2010/0187204 | A1 | 7/2010 | Angelella et al. | |
| 2012/0031879 | A1 | 2/2012 | Abe et al. | |
| 2013/0238114 | A1 | 9/2013 | Hiraga et al. | |

FOREIGN PATENT DOCUMENTS

| | | |
|---|---|---|
| CN | 103302369 A | 9/2013 |
| EP | 2133167 A2 | 12/2009 |
| EP | 2415546 A1 | 2/2012 |
| JP | 63316206 A | 12/1988 |
| JP | 01228727 A | 9/1989 |
| JP | 0253527 A | 2/1990 |
| JP | 07210229 A | 8/1995 |
| JP | 09117827 A | 5/1997 |
| JP | 2002011620 A | 1/2002 |
| JP | 2007083372 A | 4/2007 |
| JP | 2009146000 A | 7/2009 |
| JP | 2011083873 A | 4/2011 |

OTHER PUBLICATIONS

Decision to Grant a Patent dated Jan. 5, 2016, corresponding to Japanese patent application No. 2015-033300.
Office Action in CN Application No. 201410559189.8, dated Feb. 4, 2017.

* cited by examiner

FIG. 2
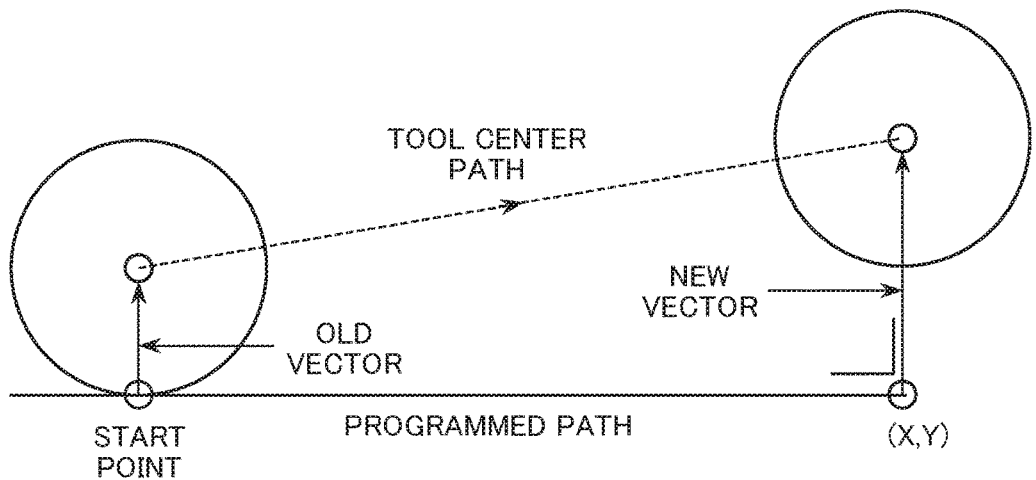
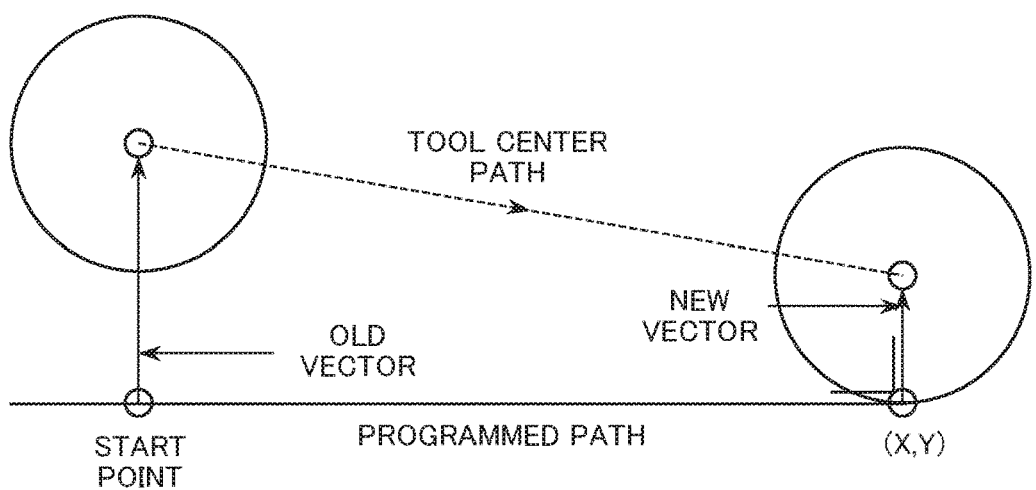
FIG. 3
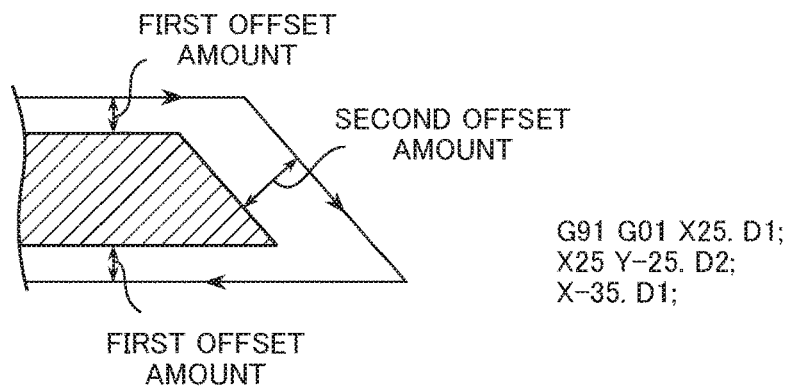
G91 G01 X25. D1;
X25 Y-25. D2;
X-35. D1;

FIG. 6
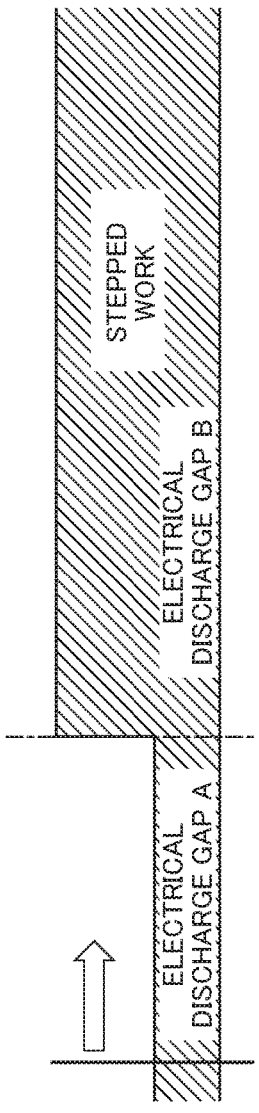
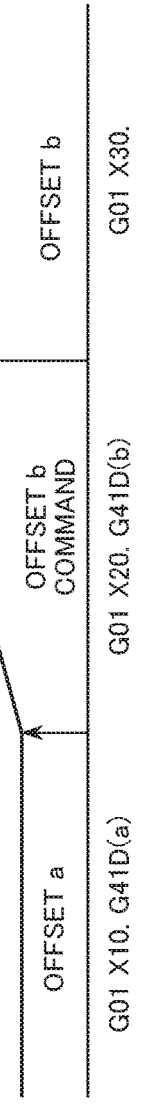
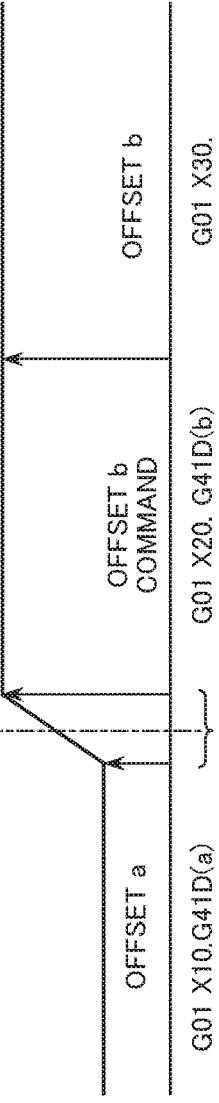
(a) WHEN STEP IS MACHINED IN LINEAR MOVING BLOCK
(b) CONVENTIONAL PROPOSAL:
OFFSET CHANGE = AT THE TIME COMMANDED BLOCK FINISHED
(c) PRESENT PROPOSAL:
OFFSET CHANGE = SHORT DISTANCE IN FRONT OF AND BEHIND START POINT OF COMMAND BLOCK (AUTOMATICALLY ADDED)

FIG. 7

(a) IN ORDINARY INTERSECTING POINT PROCESSING USING INTERSECTING POINT OF ONE BLOCK VECTOR AND NEXT BLOCK VECTOR AS VECTOR, OFFSET OF THE FIRST HALF OF NEXT BLOCK

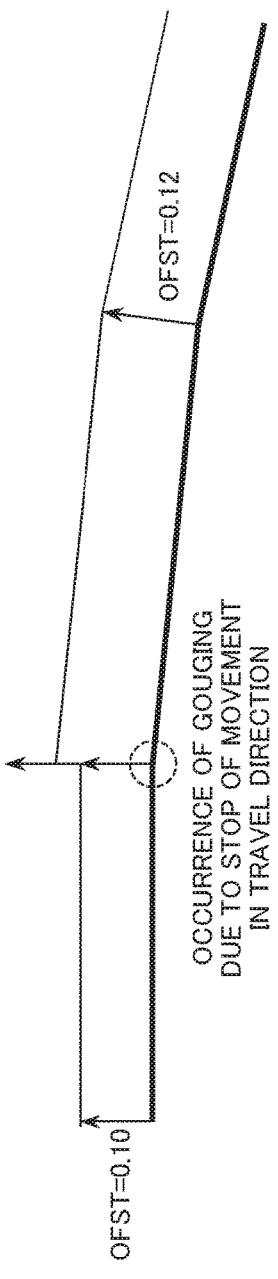

(b) IN A METHOD OF STEEPLY SHIFTING OFFSET AT INTERSECTING POINT OF PROXIMAL BLOCK, GOUGING OCCURS BECAUSE MOVEMENT IS STOPPED WHILE OFFSET IS BEING CHANGED IN CONNECTING PORTION OF NEXT BLOCK

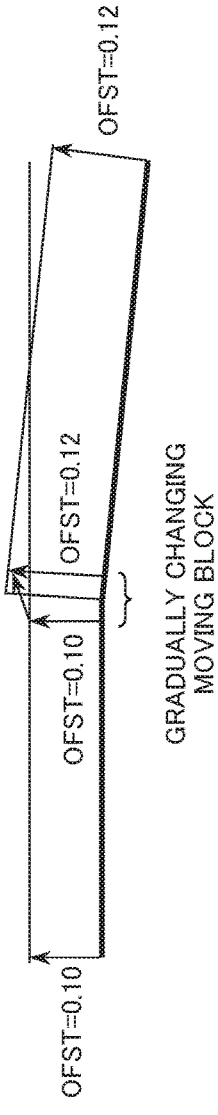

(c) IN THE METHOD, ALTHOUGH OFFSET IS CHANGED TO OFFSET INSTRUCTED IN NEXT BLOCK, GOUGING DOES NOT OCCUR BECAUSE MOVEMENT IS CARRIED OUT

FIG. 11

(a) 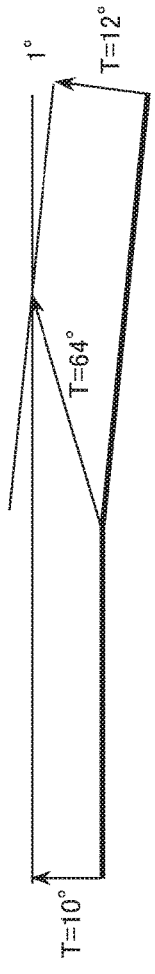
IN ORDINARY INTERSECTING POINT PROCESSING USING INTERSECTING POINT OF ONE BLOCK VECTOR AND NEXT BLOCK VECTOR AS VECTOR, TILT OF WIRE BECOMES EXCESSIVE AND EXCEEDS PERMISSIBLE TAPER ANGLE (b) 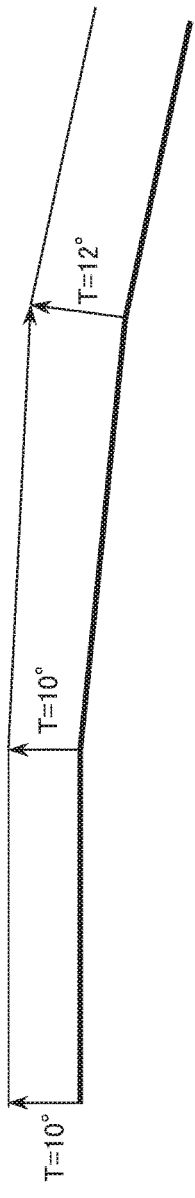
CONVENTIONALLY, INSTRUCTED TAPER ANGLE IS OBTAINED IN BLOCK AFTER THE NEXT BLOCK LIKEWISE TANGENTIAL LINE (c) 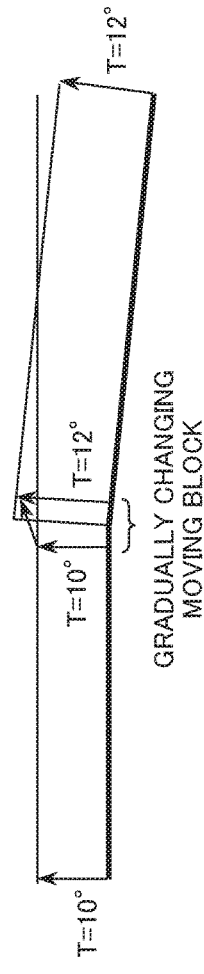
IN THE METHOD OF THE PRESENT EMBODIMENT, INSTRUCTED TAPER ANGLE IS OBTAINED IN NEXT BLOCK

FIG. 12

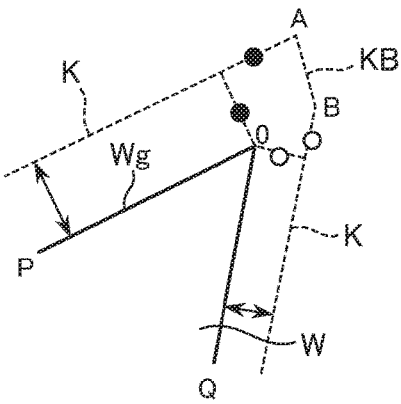

FIG. 13

(a) AS SHOWN IN FIG. 7, ALTHOUGH JP 2007-83372 A DISCLOSES METHOD OF EXCHANGING MACHINING CONDITION IN A BLOCK ADDED WHEN OUTSIDE OF ACUTE ANGLE CORNER IS MACHINED, THE METHOD CANNOT COPE WITH A TANGENTIAL LINE AND AN OBTUSE ANGLE

IN, FOR EXAMPLE, OBTUSE ANGLE OUTSIDE CORNER, SINCE MOVEMENT IN TRAVEL DIRECTION STOPS, GOUGING OCCURS IN THE PORTION

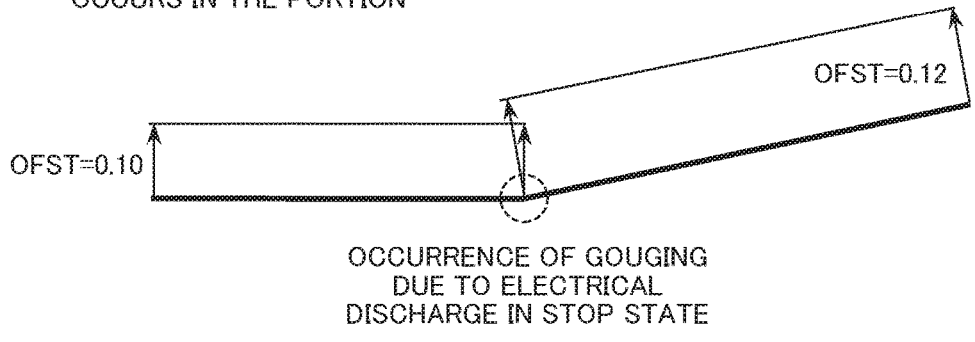

OCCURRENCE OF GOUGING
DUE TO ELECTRICAL
DISCHARGE IN STOP STATE (b) IN THE METHOD OF THE PRESENT EMBODIMENT, NO GOUGING OCCURS BECAUSE PROPER OFFSET INSTRUCTED IN NEXT BLOCK IS OBTAINED, IN ADDITION TO THAT MOVEMENT IS CARRIED OUT THEREBETWEEN

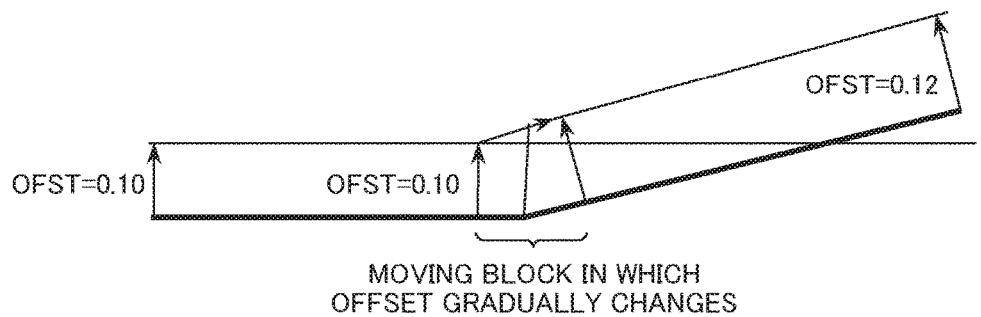

MOVING BLOCK IN WHICH
OFFSET GRADUALLY CHANGES

WITHOUT
CORRECTION

WITH
CORRECTION

FIG. 22
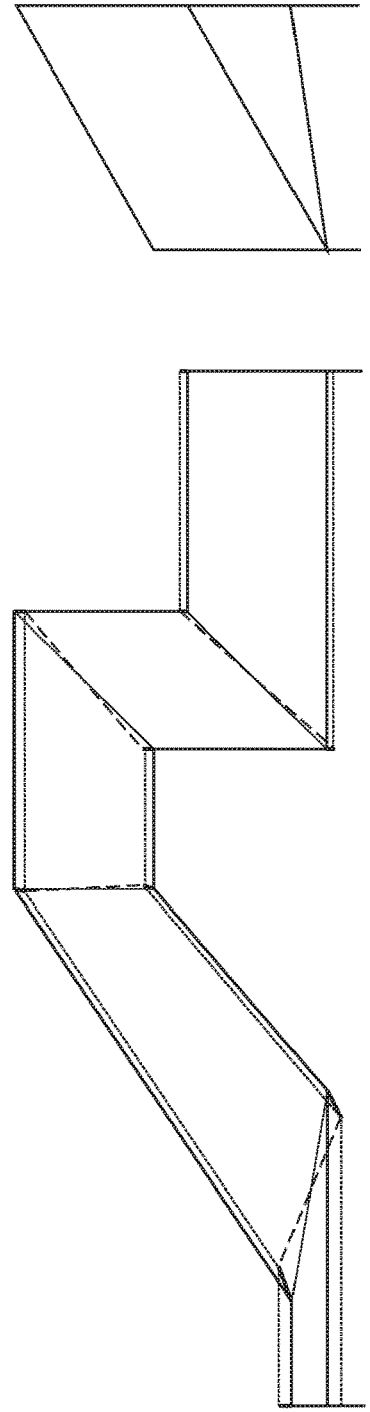
(1) IN CASE OF INTERSECTION AT CORNER, LINE-PATTERN IS NOT CONSPICUOUS
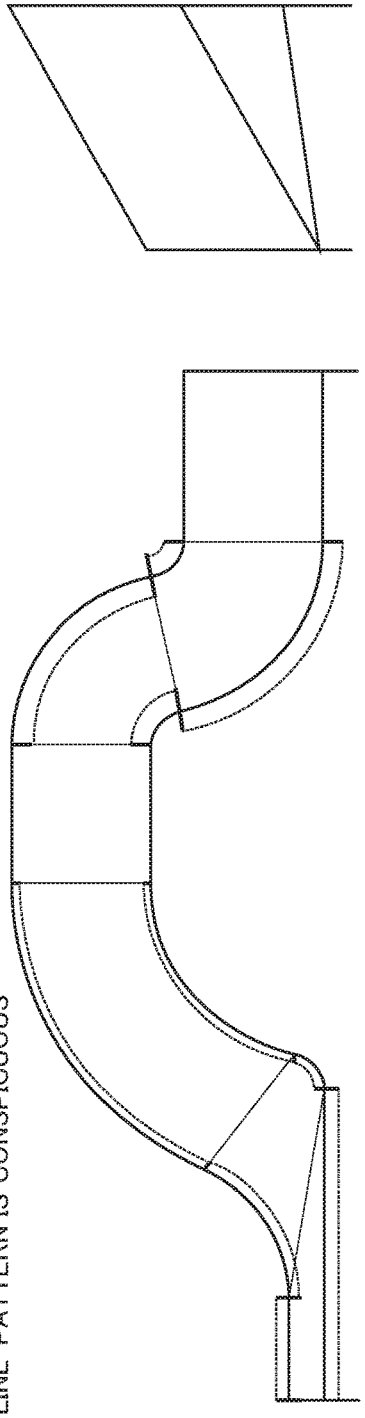
(2) IN CASE OF TANGENTIAL LINE, LINE-PATTERN IS CONSPICUOUS
——— : PROGRAMMED SHAPE
--------- : MACHINING AMOUNT CORRECTION LOCUS
········· : LOCUS AT THE TIME OF EXCHANGE

OPTIONAL DISTANCE FROM THE START AND
END POINTS OF BLOCK (RADIUS OF ARC)

ADD BLOCK IN FRONT OF AND
BEHIND OPTIONAL DISTANCE

NUMERICAL CONTROL APPARATUS OF A MACHINE TOOL FOR MACHINING A WORKPIECE BY A CUTTING TOOL ALONG MACHINING PATH INCLUDING AN OFFSET

The present application is a divisional of U.S. application Ser. No. 14/517,208 filed Oct. 17, 2014, now U.S. Pat. No. 9,821,394, and is based on and claims priority to Japanese Application Number 2013-217694, filed Oct. 18, 2013, the disclosures of which are hereby incorporated by reference herein in their entirety.

BACKGROUND OF THE INVENTION

1. Field of the Invention

The invention relates to a machine tool such as a wire-electrical discharge machine etc. and a controller for controlling the machine tool.

2. Description of the Related Art

In an ordinary machine tool using an endmill as a cutting tool, the final shape of a work can be obtained by creating a program by previously adding a radius of the endmill to a machining path (programmed path) as an offset value (refer to FIG. 1). Although the offset value (tool diameter correction amount) is ordinarily changed when a tool is exchanged in an offset cancel operation, only positioning (G00) and linear interpolation (G01) can be carried out during an offset mode (refer to FIG. 2). A command method is, for example, a form of G00 (or G01) of XYD, where D shows a new tool diameter correction number. As shown in FIG. 3, machining is carried out in an offset amount set to an instructed number by instructing the offset number succeeding to an address D during programming. The offset amount can be changed by changing the offset number while a program is carried out.

In a wire-electrical discharge machine that is an example of a machine tool, a method of programming a machining path for machining a work by a final dimension of the work is employed. In the method, at the time of actual machining, there is a case of finishing a final dimension of the work to a programmed dimension by carrying out machining by making shift (hereinafter called "offset") of the radius of a wire electrode line and the removed amount, which has been removed in a vertical direction from the wire electrode line to the work (distance: hereinafter, called "electrical discharge gap"), of the amount of the block that had been removed by electrical discharge heat resulting from the electrical discharge that has been carried out between the wire electrode line and the work, i.e., electrical discharge gap to a cutting-off side with respect to a machining path programmed to the final dimension.

In the machining carried out by an ordinary machine tool, for example, a milling machine using an endmill as a cutting tool to machine a work, when a program is created by previously adding a radius of the endmill to a machining path, it is not necessary to change an offset value in actual machining. However, in a wire-electrical discharge machine, an electrical discharge gap whose distance is unknown exists in addition to a radius of a wire electrode. For this reason, when the discharge gap is not known, a program including an offset value cannot be created.

In wire electrical discharge machining, when machining is carried out by a program corresponding to a shape of a final dimension and an opposite side dimension of the shape whose dimension has been reduced by electrical discharge is measured, an offset value is determined as a value half a remaining value obtained by subtracting the opposite side dimension value after machining from the opposite side dimension value of the programmed shape. As described above, in the wire-electrical discharge machine, a machining program can be previously created by using an offset function also in machining of an unknown discharge gap.

Ordinarily, although an offset determined once is not changed during machining, there occurs a case that the offset is changed due to special circumstances. For example, in a portion having a stepped section in which a machining state outstandingly changes, since an electrical discharge machining amount changes in a portion where a work is thick in and a portion where the work is thin, a discharge gap also changes. At the time, a final dimension can be properly obtained even in the stepped section by optionally changing an offset value (refer to JP 2011-83873 A).

Likewise the offset, it becomes necessary to optionally change also a taper angle command value in the middle of a machining path at the time of taper machining in which a work is machined while tilting a wire electrode to the work. Further, as described in JP 2007-83372 A, at the time of taper machining, an electrical discharge machining amount becomes different by the difference between the path length on upper surface side of a work and the path length on the lower surface side of the work. To cope with the problem, a taper machining amount correction function for correcting the difference of the electrical discharge machining amount becomes necessary. It is necessary to optionally change also the taper machining amount correction function depending on a machining portion likewise the offset.

To change an offset value during machining, it is necessary to offset, for example, paths in respective normal directions of a straight line machining path program block that is moving at the time (during machining) and a straight line machining path program block that will be carried out next, and it is necessary to previously read and calculate a next block to determine an intersecting point of a path including an offset of a next block at the end point position of a present block.

As shown in FIG. 4, in a machining path 6 in which a present block intersects a next block at a right angle (90 degrees), when offset values instructed to two blocks vary, for example, when the offset value of the present block=a and the offset of the next block=b and the former offset value is different from the latter offset value, an intersecting point of the paths, which has obtained by moving the respective blocks in parallel in the normal directions from the respective blocks becomes an actual direction change point of a moving path of the center of a tool.

First, a problem of the offset machining will be explained.

A conventional method of determining an offset path (machining path including an offset value) when a tangential line exists in a connecting point at the time two straight line blocks are connected each other on a straight line and when front and rear blocks are smoothly connected by an arc and a straight or by an arc and an arc (i.e., when the connecting point is not a cusp) will be explained. As shown in FIG. 5, when an offset change command is instructed to a block next to a present block, the offset path is gradually changed so that the start point of the next block is set to an offset value a of the present block and the end point of the next block is set to a changed offset value b for the first time. For this reason, a block to which the actually changed offset value is perfectly applied is a third block.

The conventional offset path determination method is very inconvenient because the method cannot cope with a case in which it is desired to change an offset value of only a next block. In particular, when a thin plate portion and a thick plate portion of a stepped section exist on the same straight line, the method cannot properly cope with a case in which it is desired to change an offset of only the thin plate portion (refer to FIGS. 6A, 6B and FIGS. 7A,7B).

Next, a problem of the taper machining will be explained. A taper angle can be changed by instructing a taper angle while a program is being carried out (refer to FIG. 8). A path when the taper angle is changed will be explained as to (1) a case of intersection (FIG. 9) and to (2) a case of contact (FIG. 10). (1) In the case of intersection, when a block to which a taper angle has been instructed intersects a block in front of the above block (an angle between the two blocks is one degree or more), the new taper angle is applied from the beginning of the block to which the taper angle has been instructed. (2) In the case of contact, when the block to which the taper angle has been instructed is in contact with the block in front of the above block (an angle between the two blocks is less than one degree), a previous angle is applied to the start point of the block to which the taper angle has been applied, the angle changes as the block moves and the new taper angle is applied at the end point of the block.

Also in the taper machining, when a taper angle command value is changed extending to blocks with a tangential line, a problem arises in that the change of the taper angle command value is not applied to a necessary block as shown in FIG. 10. As shown in FIG. 11A, in a case of an obtuse angle (an intersecting lines of 179 degrees) at which blocks are almost in contact with each other in the taper machining, when it is intended to change an angle on a ridge line where planes having a taper angle intersect from the paths of front and rear blocks, there is a problem that an actual wire electrode tilts greatly (in the example, a tilt of 64 degrees) and the tilt angle greatly exceeds the maximum taper angle (for example, 30 degrees) of a wire-electrical discharge machine.

As shown in FIG. 12, JP 2002-011620 A discloses such a control method that when an outside of an acute angle corner is machined, an additional block, which does not relate to an external shape to be machined, is disposed and a machining condition is changed in the portion. However, in a technology disclosed in JP 2002-011620 A, when a machining condition is changed at an intersecting point of two blocks that intersect at an obtuse angle, since machining stays while carrying out electrical discharge without a movement command at the point when the machining condition has been changed, a problem arises in that gouging occurs to the external shape to be machined (refer to FIG. 13A).

Further, also in a taper machining amount correction function shown in FIG. 14, FIG. 15, and FIG. 16, taper machining as shown in FIG. 17 will be examined in which a straight line—a left turning arc—a right turning arc—a straight line are connected by a tangential line, a wire electrode travels on a right side of a path, and the taper machining is carried out while tilting to a left side in a traveling direction in a shape for making a product on the left side of the path. (1) In the left turning arc, since a moving distance on a lower side is longer than that on an upper side, it is necessary to carry out a taper machining amount correction for putting the lower side into a work. (2) In the right turning arc, since the moving distance on the lower side is shorter than that on the upper side, it is necessary to carry out the taper machining amount correction for causing the lower side to be away from the work. (3) In also a linear movement, it is necessary to carry out the taper machining amount correction for putting the lower side into the work on the lower side where the moving distance is long.

However, the correction is carried out instantly in an instructed block, the block does not move in a travel direction in a joint of the block is moved only in a taper direction by the correction, and stays at the location with a result of occurrence of gouging due to excessive electric discharging. It is needless that, likewise the offset, in a correction method in which a correction is completed at the end point of a next block, a machining amount cannot be corrected and thus a desired correction cannot be carried out, from which a problem arises.

SUMMARY OF THE INVENTION

Accordingly, in view of the problems of the conventional technologies, an object of the invention is to provide a machine tool capable of applying an offset value and a taper machining amount correction value to a necessary portion and capable of improving an accuracy of a machining shape and a numerical control apparatus for controlling the machine tool.

A numerical control apparatus of a wire-electrical discharge machine according to the invention for electrical discharge machining a work by a wire electrode line along a machining path including an offset includes a unit configured to add a block that divides, when an offset value instructed in a first front block is different from an offset value instructed in a second rear block in two contact machining path blocks, the two blocks at points in front of and behind a connecting point of the two blocks in an optional distance, respectively, and gradually changes the offset value from the offset value instructed in the front block to the offset value instructed in the rear block, in the area between the points that newly divides the front block and the rear block.

A numerical control apparatus of a wire-electrical discharge machine according to the invention for electrical discharge machining a work by a wire electrode line along a machining path including a taper angle or taper machining amount correction amount comprises a unit configured to add a block that divides, when a taper angle or a taper machining amount correction amount instructed in a first front block is different from a taper angle or a taper machining amount correction amount instructed in a next rear block in two contact machining path blocks, the two blocks at points in front of and behind a connecting point of the two blocks in an optional distance, respectively, and gradually change the taper angle or the taper machining amount correction amount from the taper angle or the taper machining amount correction amount instructed in the front block to the taper angle or the taper machining amount correction amount instructed in the rear block, in the area between the points that newly divides the front block and the rear block.

A numerical control apparatus of a wire-electrical discharge machine according to the invention for electrical discharge machining a work by a wire electrode line along a machining path including an offset comprises a unit configured to add a block that divides, when an offset value instructed in a first front block is different from an offset value instructed in a second rear block in two contact machining path blocks, a block at a point in front of or behind a connecting point of the two blocks in an optional distance, and gradually changes the offset value, from the offset value instructed in the front block to the offset value instructed in the rear block, in the area between a start point and the end point of the divided block.

A numerical control apparatus of a wire-electrical discharge machine according to the invention for electrical discharge machining a work by a wire electrode line along a machining path including a taper angle or taper machining amount correction amount includes a unit configured to, add a block that divides, when a taper angle or a taper machining amount correction amount instructed in a first front block is different from a taper angle or a taper machining amount correction amount instructed in a next rear block in two contact machining path blocks, a block at a point in front of or behind a connecting point of the two blocks in an optional distance, respectively and gradually change the taper angle or the taper machining amount correction amount from the taper angle or the taper machining amount correction amount instructed in the front block to the taper angle or the taper machining amount correction amount instructed in the rear block, in the area between the start point and the end point of the added block.

Further, the invention includes a wire-electrical discharge machine provided with the numerical control apparatus.

A numerical control apparatus of a machine tool according to the invention for machining a work by a cutting tool along a machining path including an offset value includes a unit configured to, add a block that divides, when an offset value instructed in a first front block is different from an offset value instructed in a second rear block in two contact machining path blocks, the two blocks at points in front of and behind a connecting point of the two blocks in an optional distance, respectively, and gradually change the offset value from the offset value instructed in the front block to the offset value instructed in the rear block, in the area between the points that newly divides the front block and the rear block.

A numerical control apparatus according to the invention comprises a unit configured to add a function block, when an offset value instructed in a first front block is different from an offset value instructed in a second rear block in two contact machining path blocks, that gradually change the offset value from the offset value instructed in the front block to the offset value instructed in the rear block in the area between a point that divides the first front block an optional distance in front of a connecting point of the two blocks in a travel direction and a start point of a block behind the point.

A numerical control apparatus of a machine tool according to the invention for machining a work by a cutting tool along a machining path including an offset value comprises a unit configured to add a block, when an offset value instructed in a first front block is different from an offset value instructed in a second rear block in two contact machining path blocks, that gradually changes the offset value from the offset value instructed in the front block to the offset value instructed in the rear block, in the area between the end point of the front block and a point that divides the second rear block an optional distance behind a connecting point of the two blocks in a travel direction.

Since the invention includes the configuration described above, the invention can provide a wire-electrical discharge machine capable of applying an offset value and a taper machining amount correction value to a necessary portion and capable of improving the accuracy of a machined shape and a numerical control apparatus of the wire-electrical discharge machine and a numerical control apparatus for controlling a machine tool.

BRIEF DESCRIPTION OF THE DRAWINGS

The above-described and other objects and the feature of the invention described above and a feature thereof will become apparent from the explanation of the following embodiments in reference to attached drawings, wherein:

FIG. 2 is a view explaining to change an offset value during an offset mode;

FIG. 3 is a view explaining that instructing an offset number succeeding to an address "D" in a program causes machining to be carried out by an offset value set to the instructed number;

FIG. 6 is a view explaining a case that a step is machined in a near moving block;

FIG. 7 is a view explaining an example of exchange of offset vector in a case of almost contact (an intersecting lines of 179 degrees);

FIG. 11 an example of exchange of taper vector in a case of almost contact (an intersecting lines of 179 degrees);

FIG. 12 is a view explaining JP 2007-83372 A;

FIG. 13 is a view explaining a technical difference to JP 2007-83372 A which is a prior art document;

FIG. 22 is a view explaining an example of exchange of taper correction vector in a case of the taper machining amount correction (no additional block is used);

DETAILED DESCRIPTION OF THE PREFERRED EMBODIMENTS

First, embodiments of a wire-electrical discharge machine for machining a work by electrical discharge machining will be explained.

Figure 18:
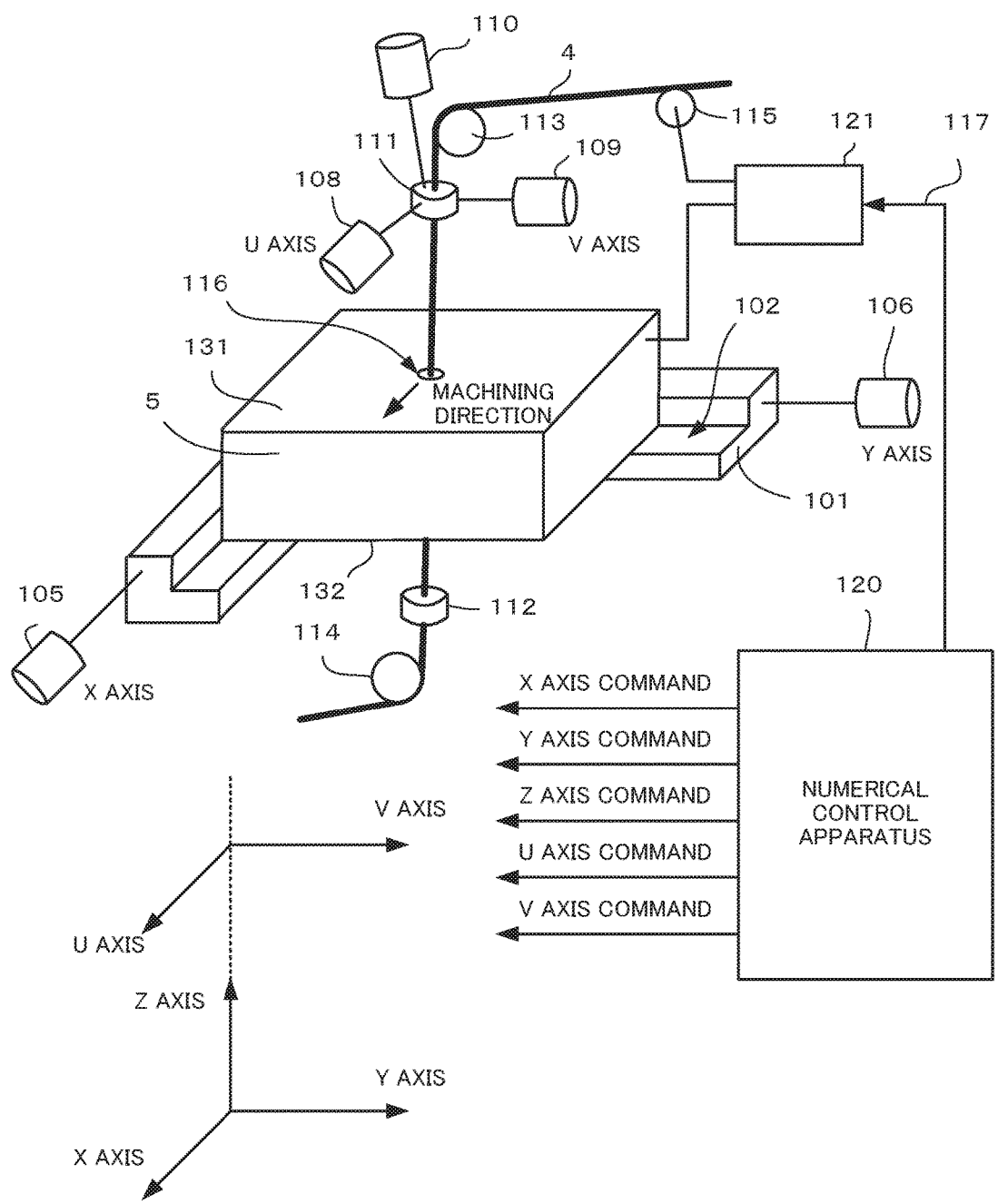
FIG. 18 is a view explaining a wire-electrical discharge machine.

FIG. 18 is a view explaining a configuration of the wire-electrical discharge machine including a taper machining function. A sign 101 denotes a work placing table on which a work 5 that is a machining target is placed and fixed. The work placing table 101 has a placing surface 102 with a highly accurate flatness. At the time of machining, the work 5 is placed on and fixed to the work placing table 101 so that its bottom surface is in contact with the placing surface 102.

To electrical discharge machining the work 5, a wire electrode 4 is supplied from a wire electrode feed reel (not shown) to a machining portion 116 via a power supply roller 115, an upper guide roller 113, and a upper wire guide 111. At the time of machining, the wire electrode 4 is stretched between the upper wire guide 111 and a lower wire guide 112 by a wire connection operation and applied with a voltage for generating discharge between it and the work 5.

The wire electrode 4 is wound around a winding reel (not shown) that draws the wire electrode 4 by predetermined tension via the machining portion 116 and further via the lower wire guide 112 and a lower guide roller 114. Note that, the wire electrode 4 may be collected in a wire collection box (not shown) in place of the winding reel.

The wire electrode 4 is supplied with electric energy for the electrical discharge machining from a machining power supply unit 121 via the power supply roller 115 according to a pulse train 117 output from a numerical control apparatus 120. The number of pulses of a pulse current input from the machining power supply unit 121 or an integrated value of the pulse current can be treated as an amount of energy. Further, a method of pouring cooling water to the machining portion 116 or submerging the work 5 in its entirety into a machining liquid (for example, pure water) is employed.

Ordinarily, the placing surface 102 of the work placing table 101 extends in a horizontal direction (on a surface parallel with an XY plane), and the work placing table 101 can be driven on an surface parallel with the XY plane that uses an X axis and a Y axis as orthogonal axes by servo motors 105, 106 of respective X and Y axes. Further, the upper wire guide 111 can be driven on the surface parallel with the XY plane by servo motors 108, 109 of respective U and V axes and can be driven in a direction orthogonal to the XY plane (±Z direction) by a servo motor 110 of a Z axis. Ordinarily, a moving direction by the U axis is parallel with a moving direction by the X axis, and a moving direction by the V axis is parallel with a moving direction by the Y axis. Note that, as conventionally known, the present positions of the respective drive axes (X axis, Y axis, Z-axis, U-axis, and V-axis) are stored in a storage unit in the numerical control apparatus 120 as machine coordinate positions. Note that, as conventionally known, the machine coordinate position of the lower wire guide 112 is also stored previously in the storage unit in the numerical control apparatus 120 as a parameter.

To change the machining portion 116, it is sufficient to change the relative position between the work 5 and the wire electrode 4 in response to commands output from the numerical control apparatus 120 to the servo motors of the respective axes (X axis command, Y axis command, Z axis command, U axis command, and V axis command). The contents of the commands are ordinarily prescribed by a machining program. The machining program is a program for prescribing a moving command of the wire electrode 4, i.e., a program for prescribing moving commands, etc. to the servo motors of the respective axes and is defined on the surface parallel with the XY plane described above. The plane to be defined can be set at an optional position in a Z axis direction. The plane that can be optionally defined is called a program-surface.

The configurations of the wire-electrical discharge machine and the numerical control apparatus for controlling the wire-electrical discharge machine described above have been conventionally known. The numerical control apparatus further includes a means for carrying out the embodiments 1-3 described below, specifically software.

(Embodiment 1) Case of Offset Command

Conventionally, as shown in FIGS. 6B and 7B, when it is instructed to change an offset value at the time front and back blocks have been approximately in contact with each other of intersected each other at less than one degree, although the offset value is gradually changed so that it becomes a value that has been changed from a start point toward an end point of a block to which the offset value command has been instructed, in the case, an offset at the position of the start point of the block where the offset value has been gradually changed is not correct.

To cope with the problem, as shown in FIGS. 6C and 7C, optional minute blocks are automatically created in front of and behind a joint (connecting point) of the block to which the offset command has been instructed, and the offset value is exchanged between the minute blocks so that a correct offset value can be obtained in a desired block. Note that, the minute blocks are automatically created not only in front of and behind the connecting point but also a minute block may be created as one block only behind an optional section from the connecting point or as one block only in front of an optional section from the connecting point.

Figure 19:
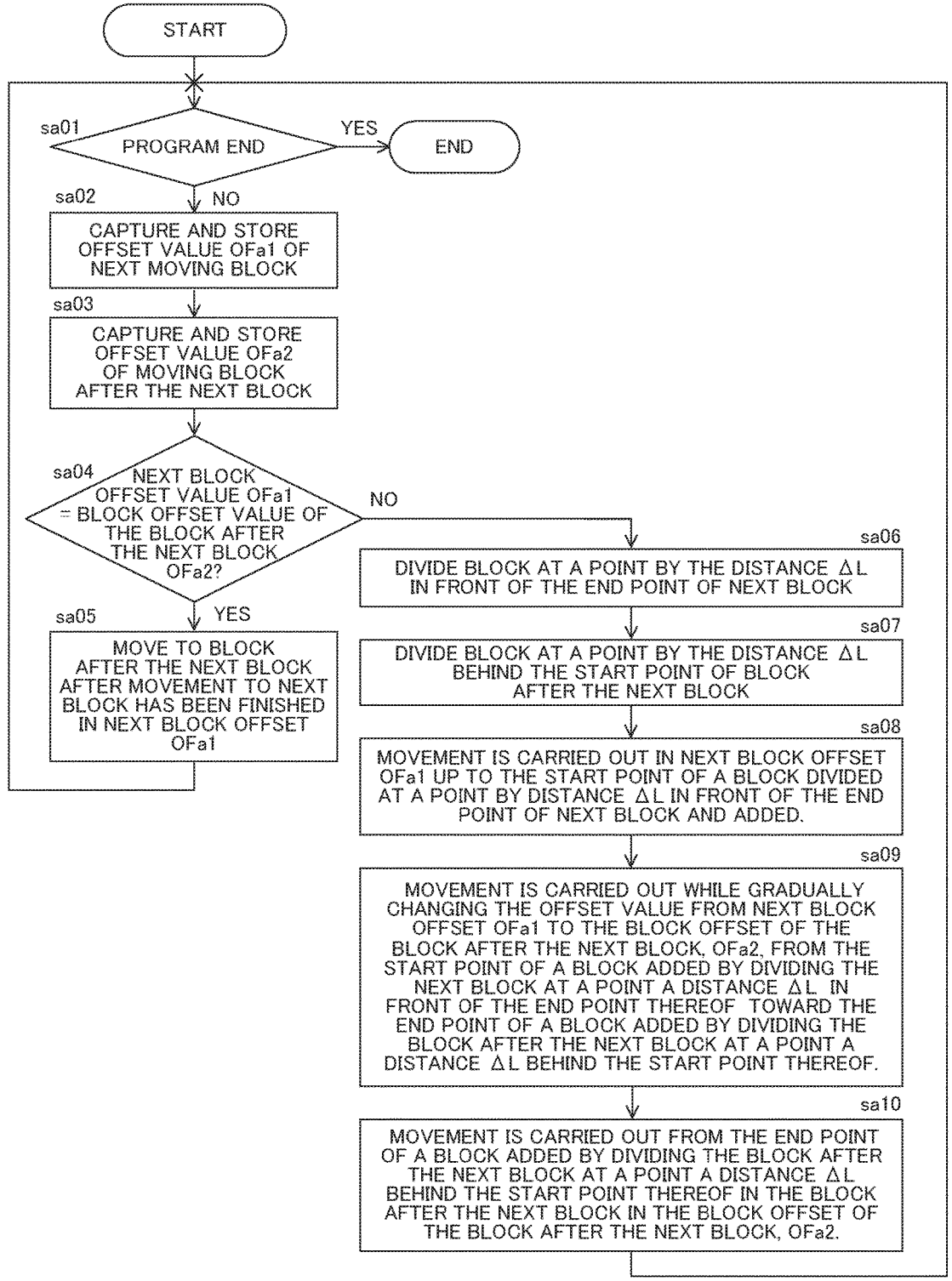
FIG. 19 is a flowchart explaining processing of an embodiment 1.

FIG. 19 is a flowchart of the embodiment 1. Here, FIG. 19 is a flowchart of processing when minute blocks that extend in front of and behind a joint of a block are provided.

[Step sa01] Whether or not a program is finished is determined, and when the program is finished (YES), a process is finished, whereas when the program is not finished (NO), the process goes to step sa02.

[Step sa02] A next block offset value OFa1 of a next moving block is captured and stored in a memory. Note that, the next moving block is a block that will be carried out next to a block that is being carried out at the time.

[Step sa03] A block offset value of a block after the next block, OFa2, of the moving block after the next block is captured and stored in the memory. Note that, the moving block after the next block is a block that will be carried out next to the next block that is being carried out at the time after the first block.

[Step sa04] Whether or not the next block offset value OFa1 is equal to the block offset value of a block after the next block, OFa2, is determined, and when they are equal to each other (YES), the process goes to step sa05, whereas when they are not equal to each other (NO), the process goes to step sa06.

[Step sa05] A movement to the block after the next block is carried out after the movement of the next block has been finished in the next block offset value OFa1.

[Step sa06] A block is divided at a point by a distance ΔL in front of the end point of the next block.

[Step sa07] The block is divided at a point by a distance ΔL behind the start point of the block after the next block.

[Step sa08] A movement is carried out in the next block offset value OFa1 up to a start point of a block added by dividing the next block at a point the distance ΔL in front of the end point of the next block.

[Step sa09] A movement is carried out while gradually changing the offset value from the next block offset value OFa1 to the block offset value of the block after the next block, OFa2, from a start point of a block added by dividing the block at a point a distance ΔL in front of the end point thereof toward an end point of a block added by dividing the next bock at a point the distance ΔL behind a start point thereof.

[Step sa10] A movement is carried out from an end point of a block added by dividing the block after the next block at a point a distance ΔL behind a start point thereof in the block after the next block in the block offset value of the block after the next block, OFa2.

Note that, the minute blocks are automatically created not only in front of and behind the connecting point but also a minute block may be created as one block only behind an optional section from the connecting point (in the case, ΔL=0 at step sa06) or as one block only in front of an optional section from the connecting point (in the case, ΔL=0 at step sa07). Thus, when a block is added so that the block does not extend to two blocks, the offset value is gradually changed so that the next block offset value OFa1 is set at the start point of the added block and the block offset value of the block after the next block, OFa2, is set at the end point thereof. Further, the length ΔL at step sa06 need not be equal to that of ΔL at step sa07.

The wire-electrical discharge machine, which includes the means configured to add a block that divides, when an offset value instructed in a first front block is different from an offset value instructed in a next rear block in two contact machining path blocks, the two blocks in front of and behind a connecting point of the two blocks in an optional distance, respectively and gradually changes from the offset value instructed in the front block to the offset value instructed in the rear block between a newly divided point of the front block and a newly divided point of the rear block, is configured by the embodiment 1.

Likewise, a controller of a wire-electrical discharge machine for electrical discharge machining a work by a wire electrode line along a machining path including an offset, which includes means configured to add a block that divides, when an offset value instructed in a first front block is different from an offset value instructed in a next rear block in two contact machining path blocks, a block in front of or behind a connecting point of the two blocks, respectively in an optional distance and gradually changes from the offset value instructed in the front block to the offset value instructed in the rear block between a newly divided point of the front block and a newly divided point of the block, is configured.

Likewise, a wire-electrical discharge machine for electrical discharge machining a work by a wire electrode line along a machining path including an offset, which include means configured to add a block that divides, when an offset value instructed in a first front block is different from an offset value instructed in a next rear block in two contact machining path blocks, a block in front of or behind a connecting point of the two blocks in an optional distance and gradually changes from the offset value instructed in the front block to the offset value instructed in the rear block between a start point to the end point of the divided block, is configured.

Likewise, a controller of a wire-electrical discharge machine for electrical discharge machining a work by a wire electrode line along a machining path including an offset, which include means configured to add a block that divides, when an offset value instructed in a first front block is different from an offset value instructed in a next rear block in two contact machining path blocks, a block in front of or behind a connecting point of the two blocks in an optional distance and gradually changes from the offset value instructed in the front block to the offset value instructed in the rear block between a start point to the end point of the divided block, is configured.

According to the embodiment, an offset value can be optimally applied to a necessary portion and the accuracy of a machined shape can be improved. Specifically, when a tangential line exists at a connecting point of a block on the same straight line and at a connecting point of front and back blocks, blocks are added in front of and behind the connecting point in a previously set short distance, the start point of the added block on a proximal side has the same offset as a present block, and half the offset difference of the two originally existing blocks is corrected at the end point of the first end block. Further, the end blocks can be automatically added and an offset can be changed in a very slight distance so that the offset value of the next originally existing block is set at the end point of the next end block added from the originally existing tangential line or joint (connecting point), as shown in FIG. 13B.

Note that, although the invention can achieve a higher effect when front and back blocks intersect each other at a connecting point at less than one degree, the invention can be also applied to a case that they intersect each other at one degree or more.

(Embodiment 2) Case of Taper Angle Command Machining

Figure 10:
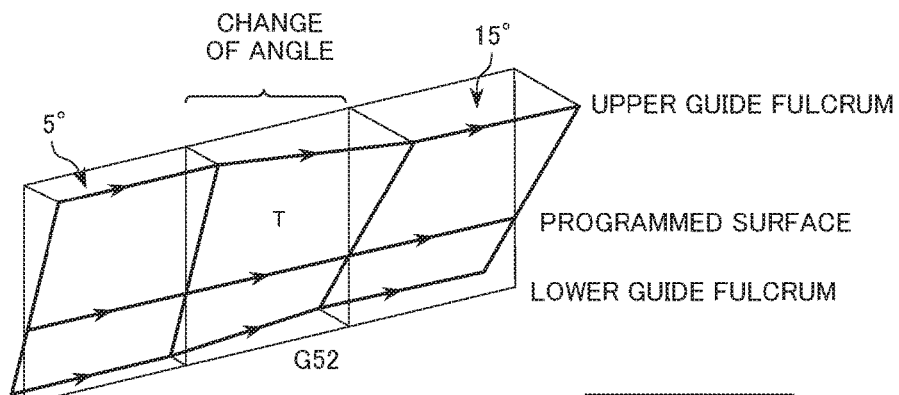
FIG. 10 is a view explaining a path when the taper angle is changed (the case of contact)
Figure 14:
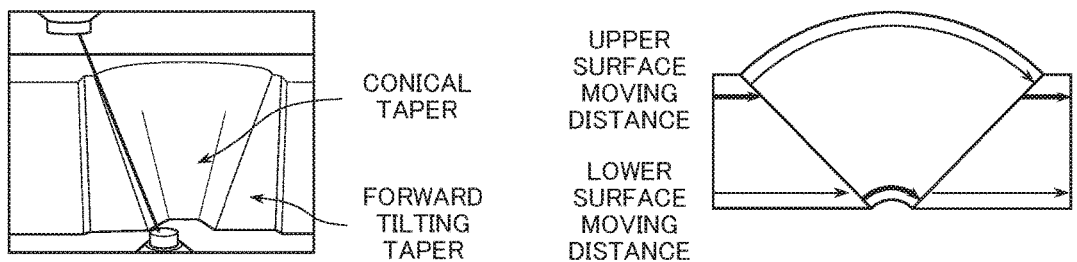
FIG. 14 is a view explaining a case that a work is machined in a conical shape by wire electrical discharge machining.
Figure 15:
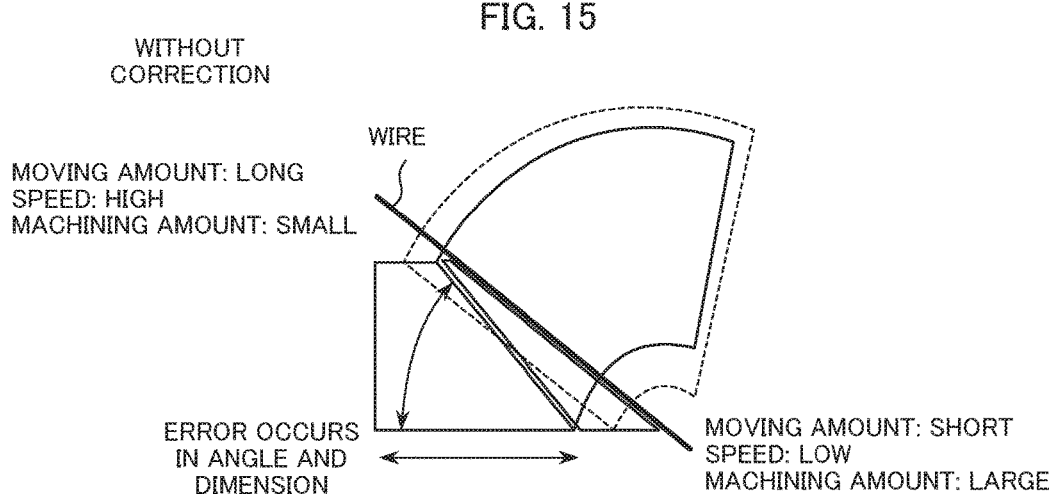
FIG. 15 shows an example in which no correction is carried out in taper machining.
Figure 16:
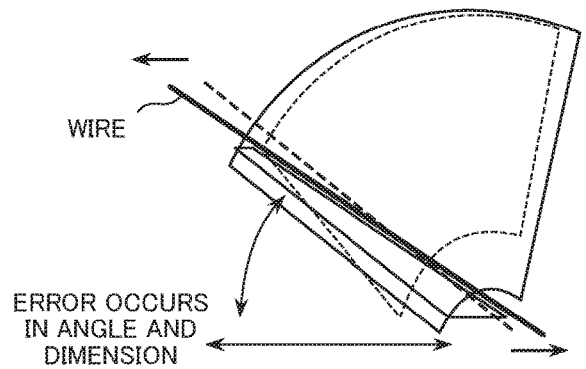
FIG. 16 shows an example in which correction is carried out in taper machining.

Conventionally, as shown in FIGS. 10 and 11A, when it is instructed to change a taper angle when front and back blocks are approximately in contact with each other or intersect each other at less than one degree, the taper angle is gradually changed so that its value becomes a changed value from a start point to an end point of a block to which the taper angle command has been instructed as shown in FIG. 11B. However, in the method, the taper angle at position of the start point of the block where the taper angle is gradually changed is not correct.

To cope with the problem, likewise the taper angle command described above, optional minute blocks are automatically created in front of and behind a joint (connecting point) of the block to which the taper angle command has been instructed, and the taper angle command is exchanged between the minute blocks so that a correct taper angle command can be obtained in a desired block, as shown in FIG. 11C. Note that, the minute blocks are automatically created not only in front of and behind the connecting point but also a minute block may be created as one block only behind an optional section from the connecting point or as one block only in front of an optional section from the connecting point.

Figure 20:
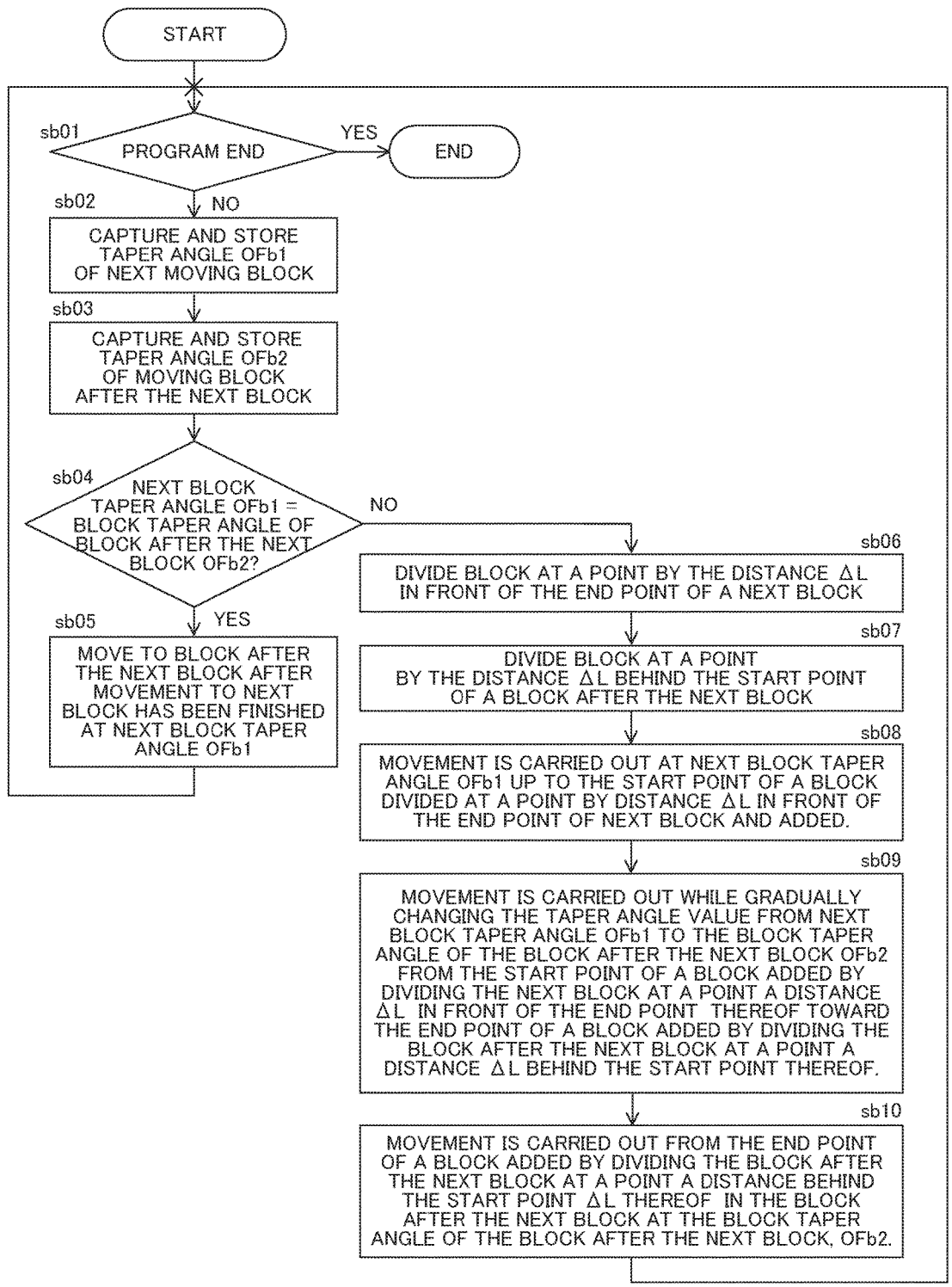
FIG. 20 is a flowchart explaining processing of an embodiment 2.

FIG. 20 is a flowchart of processing of the embodiment 2. Here, FIG. 20 is a flowchart of processing when minute blocks that extend in front of and behind a joint of a block are provided.

[Step sb01] Whether or not a program is finished is determined, and when the program is finished (YES), a process is finished, whereas when the program is not finished (NO), the process goes to step sb02.

[Step sb02] A next block offset value OFa1 of a next moving block is captured and stored in a memory. Note that, the next block is a block that will be carried out next to a first block that is being carried out at the time.

[Step sb03] A block taper angle command value of a block after the next block, OFb2, of a moving block after the next block, is captured and stored in the memory. Note that, the moving block after the next block is a block that will be carried out next to the next block that is being carried out at the time after the first block has been carried out.

[Step sb04] Whether or not the next block taper angle command value OFb1 is equal to the block taper angle command value of the block after the next block, OFb2, is determined, and when they are equal to each other (YES), the process goes to step sb05, whereas when they are not equal to each other (NO), the process goes to step sb06.

[Step sb05] A movement to the block after the next block is carried out after the movement of the next block has been finished in the next block taper angle command value OFb1.

[Step sb06] A block is divided at a point by a distance ΔL in front of the end point of the next block.

[Step sb07] The block is divided at a point by a distance ΔL behind the start point of the block after the next block.

[Step sb08] A movement is carried out in the next block taper angle command value OFb1 up to a start point of a block added by dividing the next block at a point a distance ΔL in front of the end point of the next block.

[Step sb09] A movement is carried out while gradually changing the taper angle command from the next block taper angle command value OFb1 to the block taper angle command value of the block after the next block, OFb2, from a start point of the block added by dividing the next block at a point a distance ΔL in front of the end point thereof, toward an end point of the block added by dividing the block after the next block at a point a distance ΔL behind a start point thereof and added.

[Step sb10] A movement is carried out from an end point of a block added by dividing the block after the next block at a point by a distance ΔL behind a start point thereof in the block after the next block in the block taper angle command value of the block after the next block, OFb2.

Note that, the minute blocks are automatically created not only in front of and behind the connecting point but also a minute block may be created as one block only behind an optional section from the connecting point (in the case, ΔL=0 at step sb06) or as one block only in front of an optional section from the connecting point (in the case, ΔL=0 at step sb07). Thus, when a block is added so that the block does not extend to two blocks, the taper angle command value is gradually changed so that the next block taper angle command value OFb1 is set at the start point of the added block and the block taper angle command value of the block after the next block, OFb2, is set at the end point thereof. Further, the length ΔL at step sb06 need not be equal to that of ΔL at step sb07.

(Embodiment 3) Case of Taper Machining Amount Correction

Figure 17:
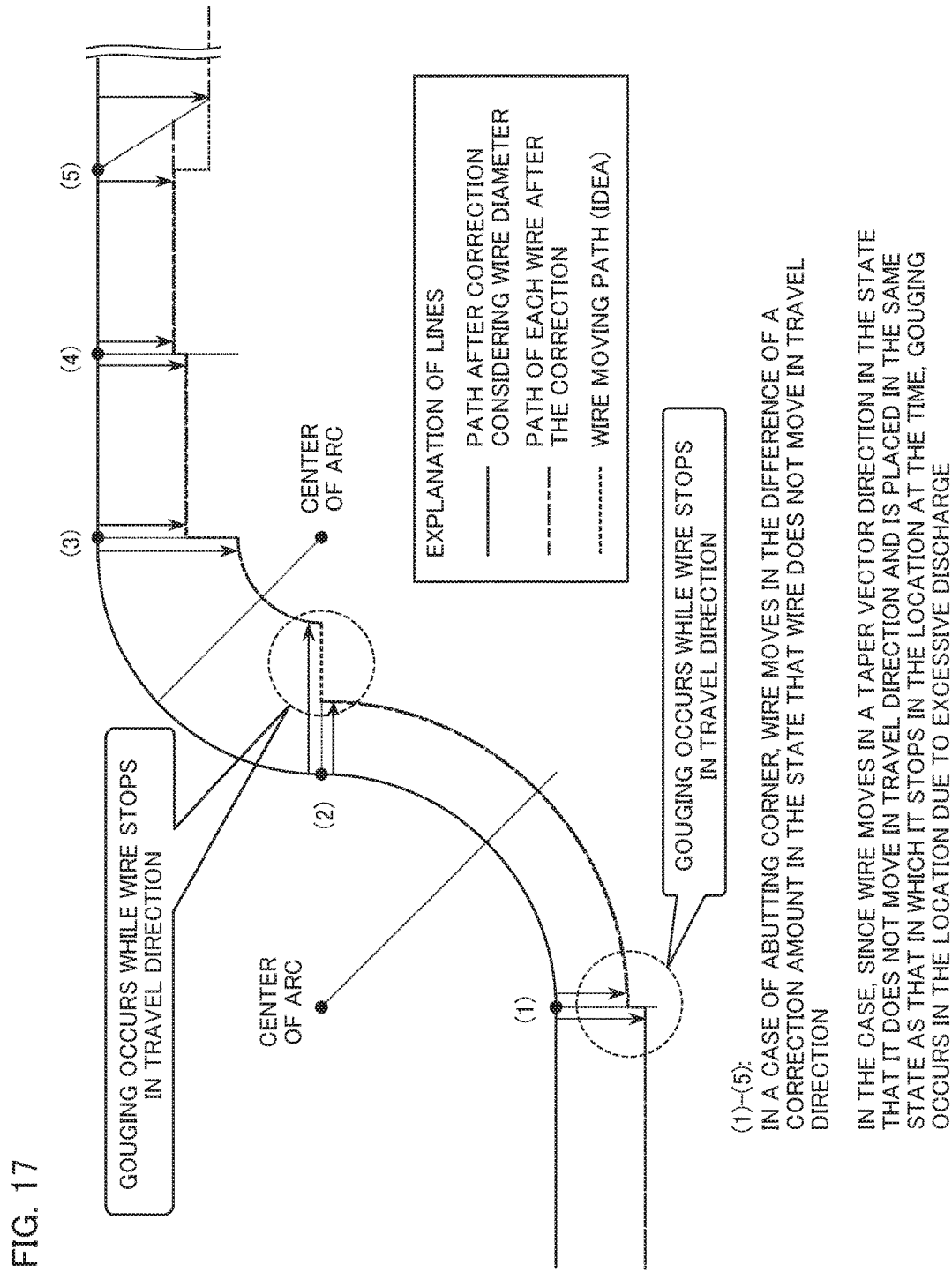
FIG. 17 is a view explaining that no exchange block is used in a taper machining amount correction (a case of a contact corner)

Conventionally, as shown in FIG. 17, when it is instructed to change a taper machining amount correction value when front and back blocks are approximately in contact with each other, the correction amount is instantly applied from a start point of a block to which the machining amount correction command is instructed in a correction direction, i.e., a normal vector direction (taper vector direction) of a path. However, in the method, since the taper machining amount correction value does not move in a travel direction and moves in a normal direction without delay, gouging due to excessive electric discharging occurs on a machined surface during a moving time.

Figure 21:
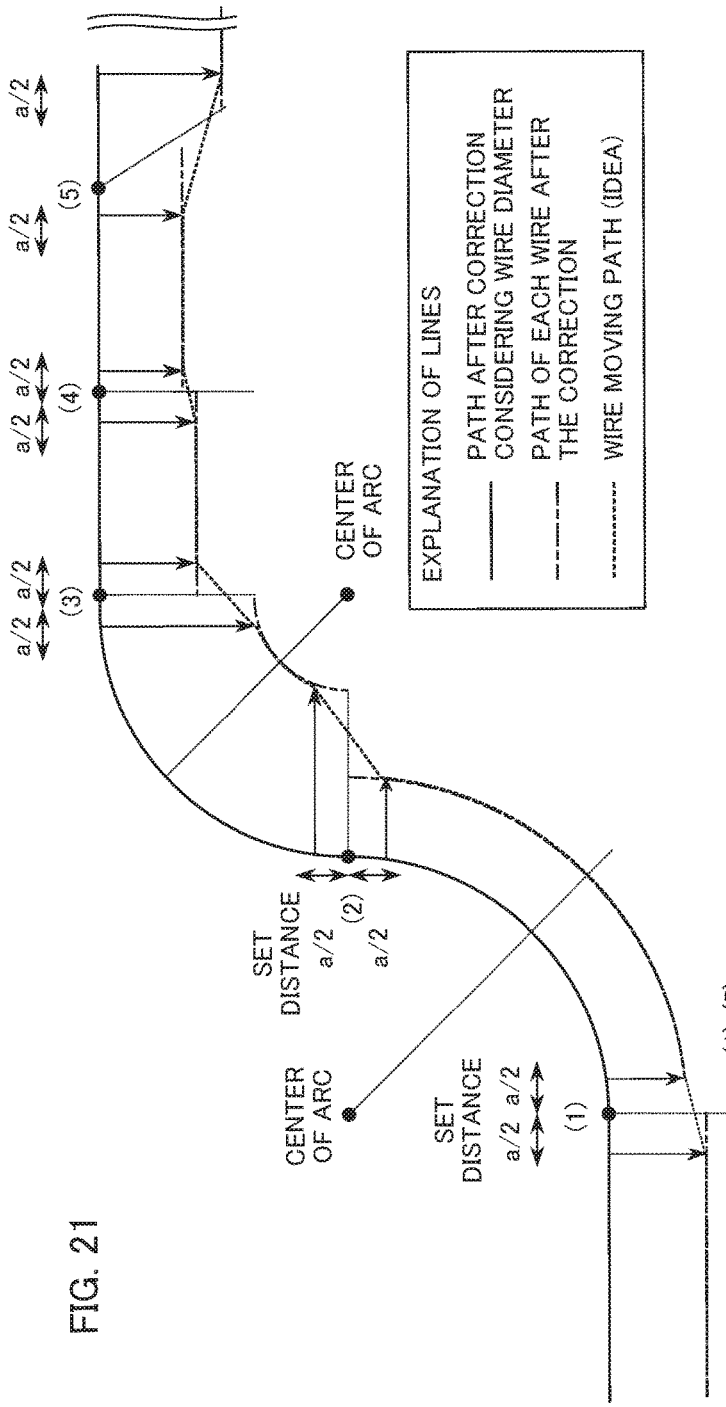
FIG. 21 is a view explaining an exchange block function in the taper machining amount correction (the case of the contact corner)

To cope with the problem, as shown in FIG. 21, minute blocks are automatically created in front of and behind a joint (connecting point) of a block where the machining amount correction value command is changed, the taper machining amount correction value is exchanged between the minute blocks, and the taper machining amount correction value is changed while being moved in front of and behind the connecting point.

FIG. 22 is a view explaining an example of exchange of a taper correction vector when a taper machining amount is corrected (additional block is absent). Taper machining amount correction values are added on a work upper surface side and a work lower surface side, respectively in a taper vector direction of a wire electrode likewise the offset amount. At the time, in a case of FIG. 22A in which respective moving blocks intersect at a corner, a correction path is created by connecting paths that include upper and lower side correction amounts, respectively. However, as shown in FIG. 22B, in a case in which blocks are in contact with each other via an arc, i.e., in a case in which paths including correction amounts do not intersect each other, when the correction amounts are exchanged at end points of the blocks, a step-line occurs at the time of exchange.

Figure 23:
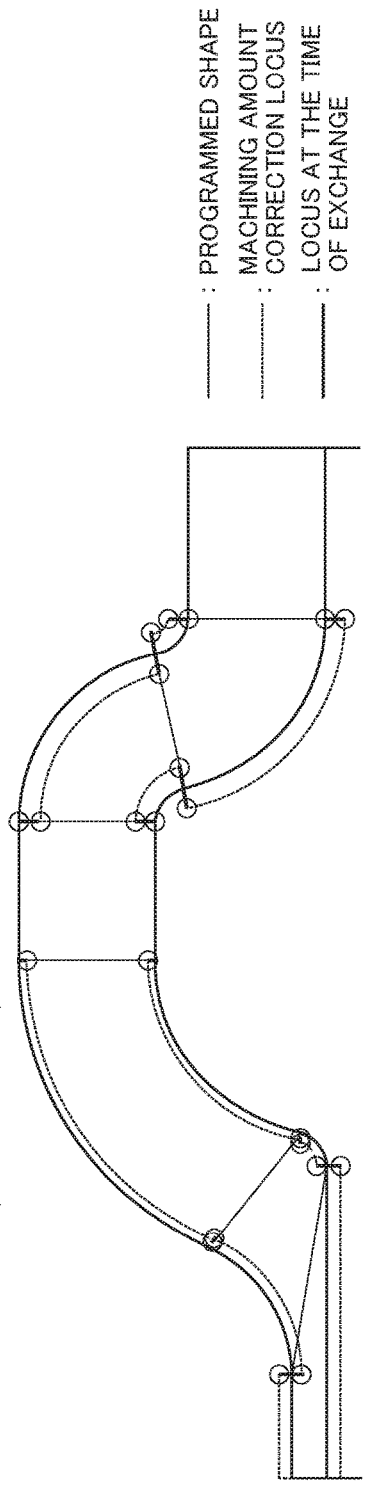
FIG. 23 is a view explaining an example of exchange of the taper correction vector in the case of the taper machining amount correction (an additional block is used)
Figure 24:
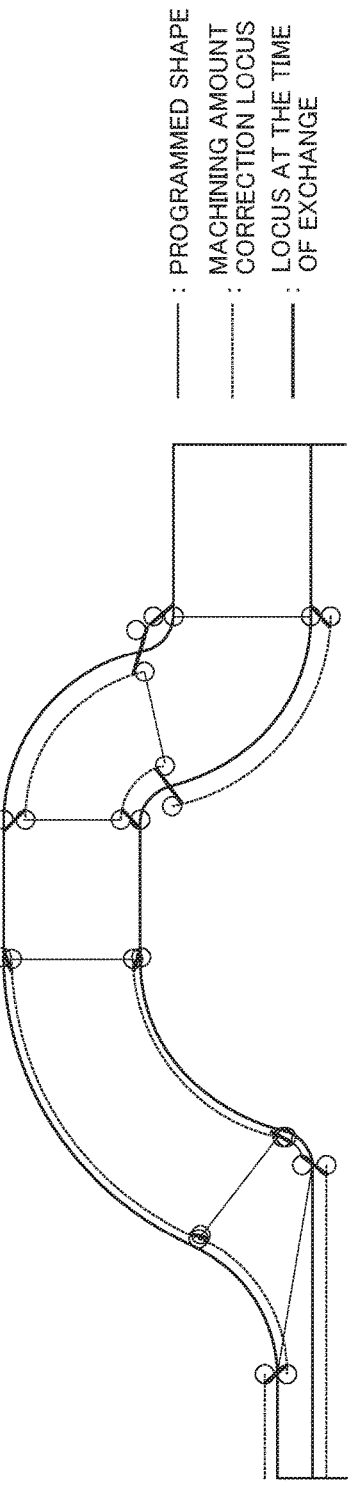
FIG. 24 is a view explaining an example of exchange of the taper correction vector in the case of the taper machining amount correction (the additional block is used)

FIG. 23 is a view explaining an example of exchange of the taper correction vector when the taper machining amount is corrected (additional block is present). FIG. 24 is a view explaining an example of exchange of the taper correction vector when the taper machining amount is corrected (additional block is present). As explained in FIG. 23 and FIG. 24, optional distances from an end point and a start point of a correction amount path (in the case, the distances are shown by intersecting points with circles) are determined, respectively and a block, which connects a point divided at a position in front of the optional distance from the end point to a point divided at a position having the optional distance from a start point of a next block, thereby the correction amount path can be smoothly connected.

Figure 26:
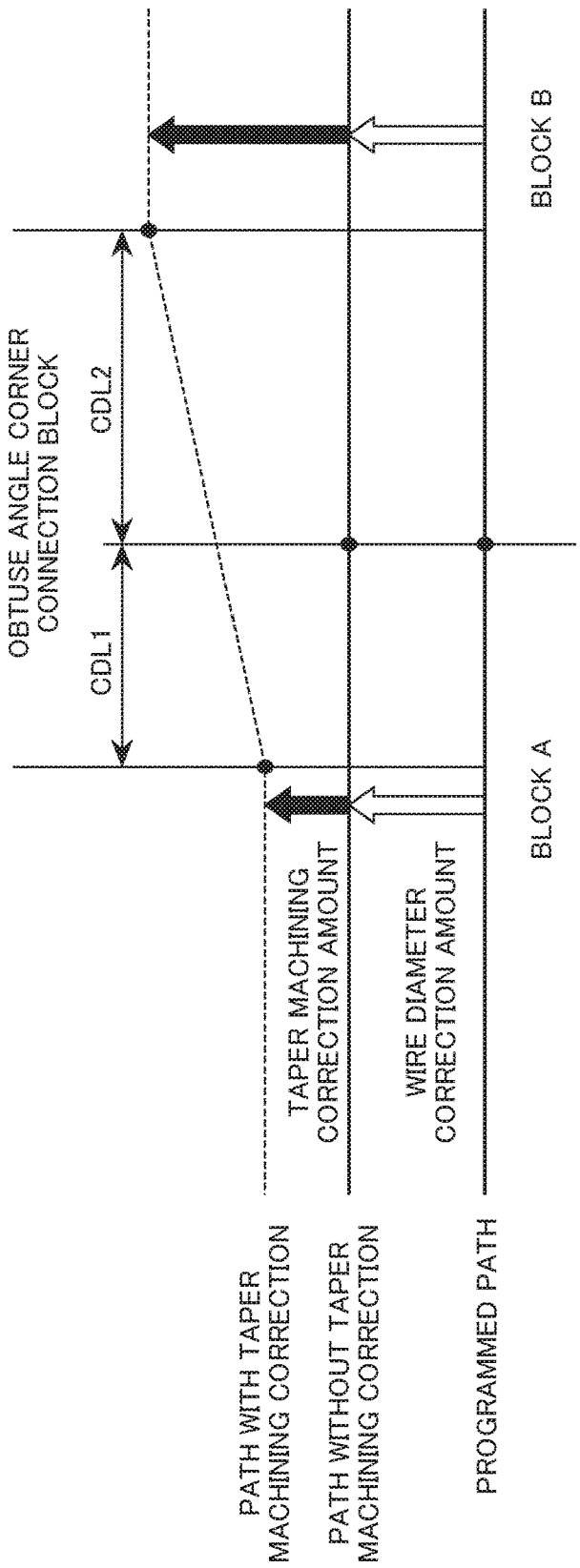
FIG. 26 is a view explaining a taper machining correction path in an almost contact obtuse angle corner.

FIG. 26 is a view explaining a taper machining correction path at an almost contact obtuse angle. When a highly accurate taper machining correction amount changes at the almost obtuse angle corner, i.e., in a state that a front block intersects a rear block at less than one degree, an obtuse angle corner connection block is inserted to gradually change the highly accurate taper machining correction amount. A path in the case becomes a path shown by a broken line in FIG. 26. An insertion position of the obtuse angle corner connection block is set to an obtuse angle corner connection distance 1CDL1 <Rxxxx+4> and an obtuse angle corner connection distance 2CDLD <Rxxxx+8>. Note that, the minute blocks are automatically created not only in front of and behind the connecting point but also a minute block may be created as one block only behind an optional section from the connecting point or as one block only in front of an optional section from the connecting point.

Figure 25:
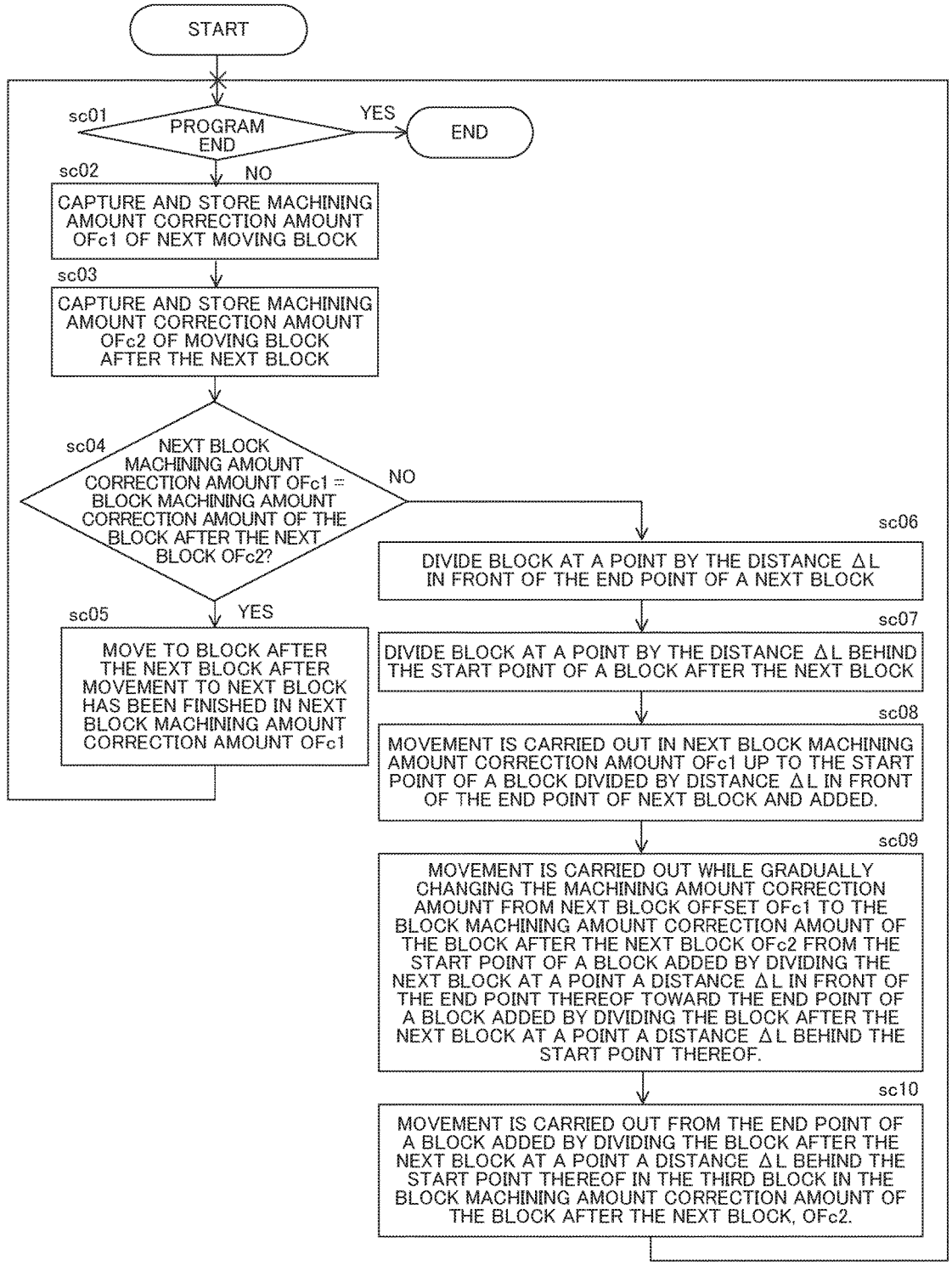
FIG. 25 is a flowchart explaining processing of an embodiment 3.

FIG. 25 is a flowchart of processing of the embodiment 3. FIG. 25 is a flowchart of processing when minute blocks that extend in front of and behind a joint of a block are provided.

[Step sc01] Whether or not a program is finished is determined, and when the program is finished (YES), a process is finished, whereas when the program is not finished (NO), the process goes to step sc02.

[Step sc02] A next block taper machining amount correction amount OFc1 of a next moving block, that is, the next moving block, is captured and stored in a memory. Note that, the next block is a block that will be carried out next to a first block that is being carried out at the time.

[Step sc03] A block taper machining amount correction amount of the block after the next block, OFc2, of the third moving block is captured and stored in the memory. Note that, the block after the next block is a block that will be carried out next to the next block that is being carried out at the time after the first block has been carried out.

[Step sc04] Whether or not the next block taper machining amount correction amount OFc1 is equal to the block taper machining amount correction amount of the block after the next block, OFc2, is determined, and when they are equal to each other (YES), the process goes to step sc05, whereas when they are not equal to each other (NO), the process goes to step sc06.

[Step sc05] A movement to the block after the next block is carried out after the movement of the next block has been finished in the next block taper machining amount correction amount OFc1.

[Step sc06] A block is divided at a point by a distance $\Delta L$ in front of the end point of the next block.

[Step sc07] The block is divided at a point by a distance $\Delta L$ behind the start point of the block after the next block.

[Step sc08] A movement is carried out in the next block taper machining amount correction amount OFc1 up to a start point of a block added by dividing the next block at a point a distance $\Delta L$ in front of the end point of the next block.

[Step sc09] A movement is carried out while gradually changing the taper machining amount correction amount from the next block taper machining amount correction amount OFc1 to the block taper machining amount correction amount of the block after the next block, OFc2, from a start point of a block added by dividing at a point a distance $\Delta L$ in front of the end point thereof and added toward an end point of a block added by dividing at a point by a distance $\Delta L$ behind a start point thereof.

[Step sc10] A movement is carried out from an end point of a block added by dividing the block after the next block at a point a distance $\Delta L$ behind a start point thereof in the block after the next block in the block taper machining amount correction amount of the block after the next block, OFc2.

Note that, the minute blocks are automatically created not only in front of and behind the connecting point but also a minute block may be created as one block only behind an optional section from the connecting point (in the case, $\Delta L=0$ at step sc06) or as one block only in front of an optional section from the connecting point (in the case, $\Delta L=0$ at step sc07). Thus, when a block is added so that the block does not extend to two blocks, the taper machining amount correction amount is gradually changed so that the next block taper machining amount correction amount OFc1 is set at the start point of the added block and the block taper machining amount correction amount of the block after the next block, OFc2, is set at the end point thereof. Further, the length $\Delta L$ at step sc06 need not be equal to that of $\Delta L$ at step sc07.

According to the embodiment 3, a wire-electrical discharge machine for electrical discharge machining a work by a wire electrode line along a machining path including a taper machining amount correction amount, which includes means configured to add a block that divides, when a taper machining amount correction amount instructed in a first front block is different from a taper machining amount correction amount instructed in a next rear block in two contact machining path blocks, the two blocks in front of and behind a connecting point of the two blocks in an optional distance, respectively and gradually changes from the taper machining amount correction amount instructed in the front block to the taper machining amount correction amount instructed in the rear block between a newly divided point of the front block and a newly divided point of the rear block, is configured.

Likewise, a controller of a wire-electrical discharge machine for electrical discharge machining a work by a wire electrode line along a machining path including a taper machining amount correction amount, which includes means configured to add a block that divides, when a taper machining amount correction amount instructed in a first front block is different from a taper machining amount correction amount instructed in a next rear block in two contact machining path blocks, the two blocks in front of and behind a connecting point of the two blocks in an optional distance, respectively and gradually changes from the taper machining amount correction amount instructed in the front block to the taper machining amount correction amount instructed in the rear block between a newly divided point of the front block and a newly divided point of the rear block, is configured.

Likewise, a wire-electrical discharge machine for electrical discharge machining a work by a wire electrode line along a machining path including a taper machining amount correction amount, which includes means configured to add a block that divides, when a taper machining amount correction amount instructed in a first front block is different from a taper machining amount correction amount instructed in a next rear block in two contact machining path blocks, a block in front of or behind a connecting point of the two blocks in an optional distance and gradually changes from the taper machining amount correction amount instructed in the front block to the taper machining amount correction amount instructed in the rear block between a start point and the end point of the divided block, is configured.

Likewise, a controller of a wire-electrical discharge machine for electrical discharge machining a work by a wire electrode line along a machining path including a taper machining amount correction amount, which includes means configured to add a block that divides, when a taper machining amount correction amount instructed in a first front block is different from a taper machining amount correction amount instructed in a next rear block in two contact machining path blocks, a block in front of or behind a connecting point of the two blocks in an optional distance and gradually changes from the taper machining amount correction amount instructed in the front block to the taper machining amount correction amount instructed in the rear block between a start point and the end point of the divided block, is configured.

As described above, the embodiment can optimally apply an offset value and a taper machining amount correction value a necessary portion and can improve the accuracy of a machined shape. Specifically, blocks are added in front of and behind a joint (connecting point) of a block on the same straight line, and the start point of the added block on a proximal side has the same offset as a present block, and half the difference of a taper angle command of the two originally existing blocks is corrected at the end point of the first end block. Further, the end blocks can be automatically added and an offset can be changed in a very slight distance so that the taper angle command of the next originally existing block is set at the end point of the next end block added from the joint (connecting point).

Next, an embodiment 4 of the machine tool of the invention for machining a work using a cutting tool will be explained.

Figure 27:
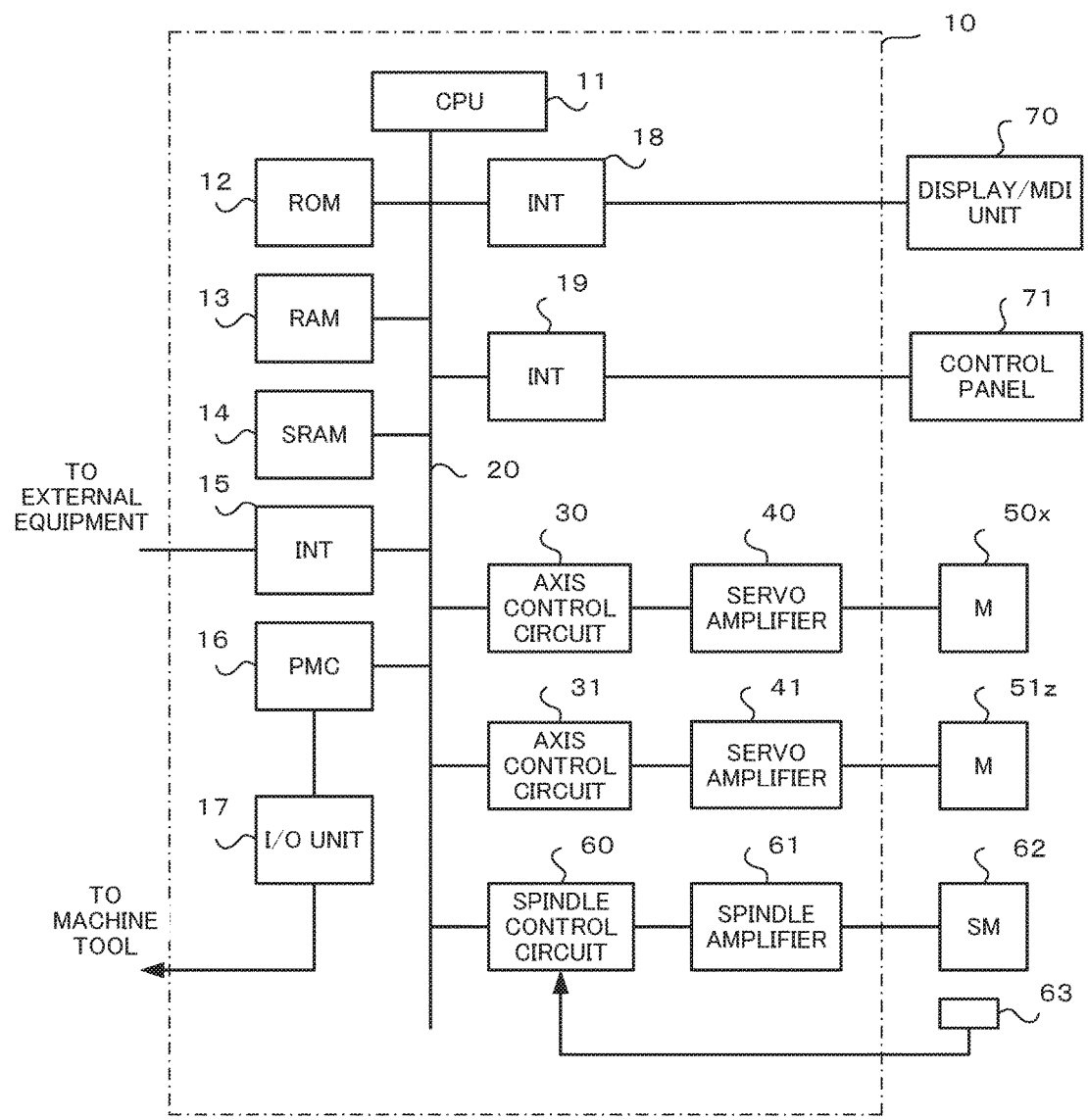
FIG. 27 is a view explaining a numerical control apparatus for controlling a machine tool.

FIG. 27 is a view explaining a numerical control apparatus for controlling the machine tool. A CPU 11 is a processor for controlling the numerical control apparatus 10 in its entirety. The CPU 11 reads a system program stored in a ROM 12 via a bus 20 and controls the numerical control apparatus 10 in its entirety according to the system program. A RAM 13 stores temporary calculation data and display data, and various data input by an operator via a display/MDI unit 70. An SRAM 14 is configured as a non-volatile memory which is backed up by a not shown battery and in which a storage unit is kept even if a power supply to the numerical control apparatus 10 is turned off.

The SRAM 14 stores a machining program (NC program) read via an interface 15 and machining program input via the display/MDI unit 70. The SRAM 14 previously stores respective table type data (path table) described above. Further, various system programs for creating a machining program and carrying out edit processing is previously written to the ROM 12. Note that, in the invention, a location where the NC program and the path table are stored is not limited to a storage unit in the numerical control apparatus. For example, the data of the NC program and the path table may be stored in an external storage unit connected via network and respective blocks of the NC program and data of the path table may be read one by one via the network.

The interface 15 allows the numerical control apparatus 10 to be connected to external equipment such as a not shown adaptor. Further, a machining program edited in the numerical control apparatus 10 can be stored in an external storage device via the external equipment. A PMC (programmable machine controller) 16 controls auxiliary devices such as an actuator of the machine tool by outputting a signal thereto by a sequence program contained in the numerical control apparatus 10 via an I/O unit 17. Further, the PCM 16 receives a signal from various switches, etc. of an operation controller disposed to a main body of the machine tool and delivers the signal to the CPU 11 after having subjected the signal to necessary signal processing. The display/MDI unit 70 is a manual data input device including a display and a keyboard, etc., and an interface 18 receives a command and data from the keyboard of the display/MDI unit 70 and delivers the command and the data to the CPU 11. An interface 19 is connected to a control panel 71 and receives various commands from the control panel 71.

Respective feed shaft control circuits 30, 31 receive movement commands of the respective feed shafts from the CPU 11 and output the commands of the respective feed shafts to servo amplifiers 40, 41. On receiving the commands, the servo amplifiers 40, 41 drive servo motors 50x, 51z of the respective feed shafts. The servo motors 50x, 51z of the respective feed shafts include not shown position/speed detectors, feedback position/speed feedback signals from the position/speed detectors to the shaft control circuits 30, 31, and feedback-controls positions and speeds. Note that, FIG. 10 does not describe the feedback of the position and the speed.

Figure 1:
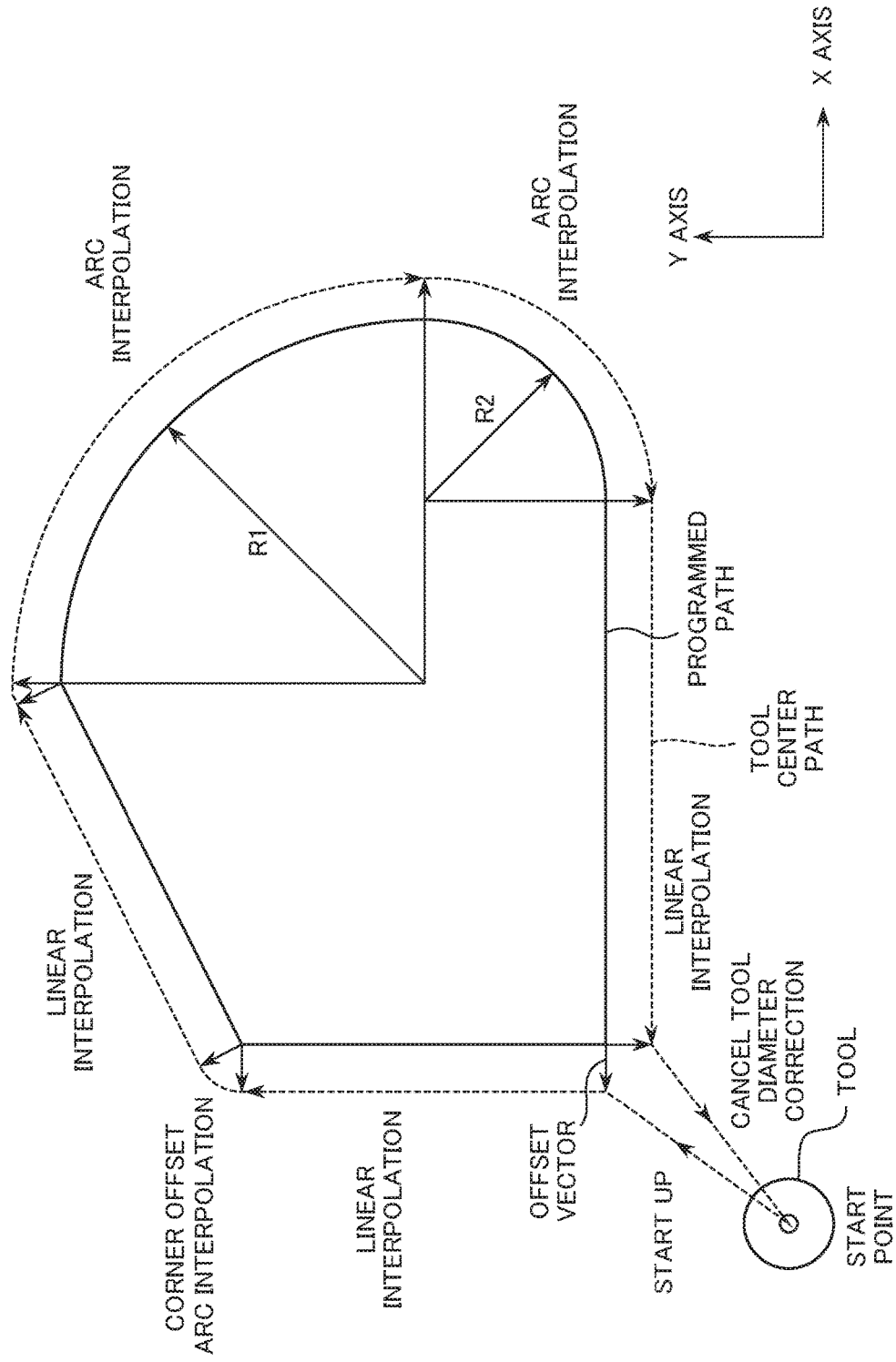
FIG. 1 is a view explaining an offset value (tool diameter correction amount)
Figure 4:
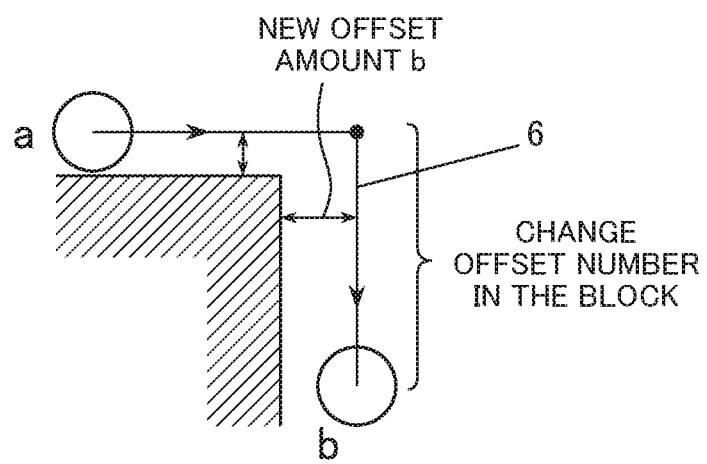
FIG. 4 is a view explaining a path when the offset amount is changed (a case of intersection)
Figure 5:
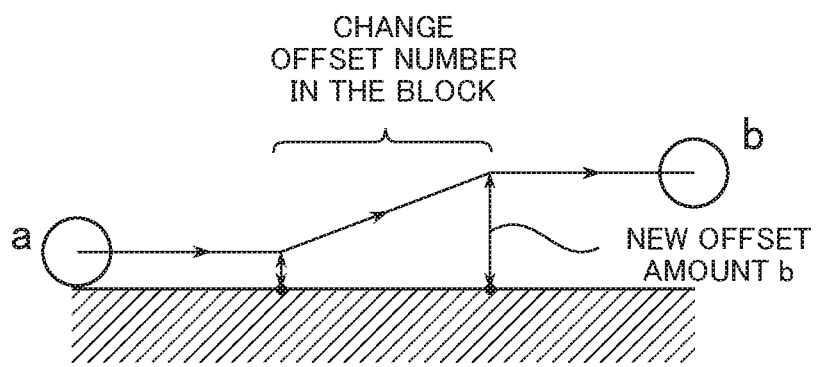
FIG. 5 is a view explaining a path when the offset amount is changed (a case of contact)
Figure 8:
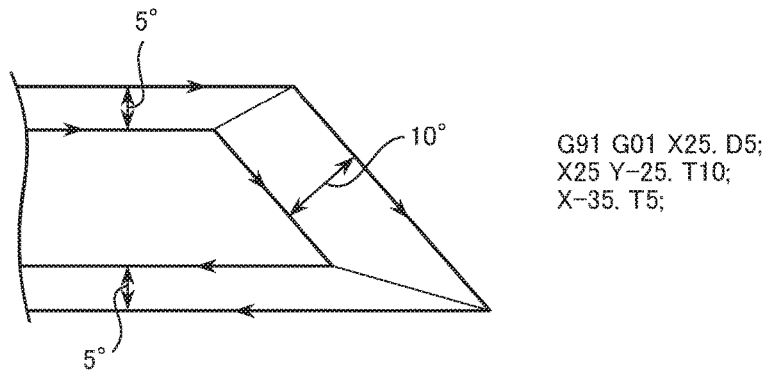
FIG. 8 is a view explaining a change of a taper angle.
Figure 9:
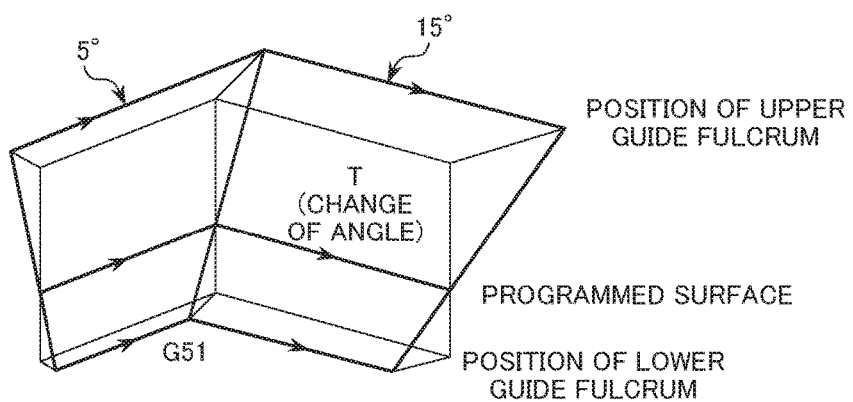
FIG. 9 is a view explaining a path when the taper angle is changed (the case of intersection)

Further, on receiving a main shaft rotation command, a spindle control circuit 60 outputs a spindle speed signal to a spindle amplifier 61. On receiving the spindle speed signal, the spindle amplifier 61 rotates a spindle motor (main shaft motor) 62 at an instructed rotation speed. A position coder 63 feedbacks a feedback pulse (reference pulse) and one rotation signal to the spindle control circuit 60 in synchronism with the rotation of the spindle motor (main shaft motor) 62 and carries out a speed control. The feedback pulse (reference pulse) and the one rotation signal are read by the CPU 11 via the spindle control circuit 60 and the feedback pulse (reference pulse) is counted by a counter (a counter corresponding to respective reference value counters of FIG. 3 and FIG. 4) disposed to the RAM 13. Note that, the command pulses of a main shaft may be counted.

Further, a counter disposed to the RAM 13 counts the number of pulses of a time signal obtained from a time measurement function of the numerical control apparatus 10 or counts the number of pulses obtained from the feedback signals from the feed shafts and obtains a reference signal when a path table drive is carried out. Otherwise, the counter may count the command pulses of the feed shafts.

According to the embodiment, an offset value can be optimally applied to a necessary portion and the accuracy of a machined shape can be improved. Specifically, at a joint (connecting point) of a block on the same straight line and at an intersecting point of two blocks that intersect at an obtuse angle, blocks are added in front of and behind the joint (connecting point) in a previously set short distance, the start point of the added block on a proximal side has the same offset as a present block, and half the offset difference of the two originally existing blocks is corrected at the end point of the first end block. Further, the end blocks can be automatically added and an offset can be changed in a very slight distance so that the offset value of the next originally existing block is set at the end point of the next end block added from the originally existing joint.

Figure 28:
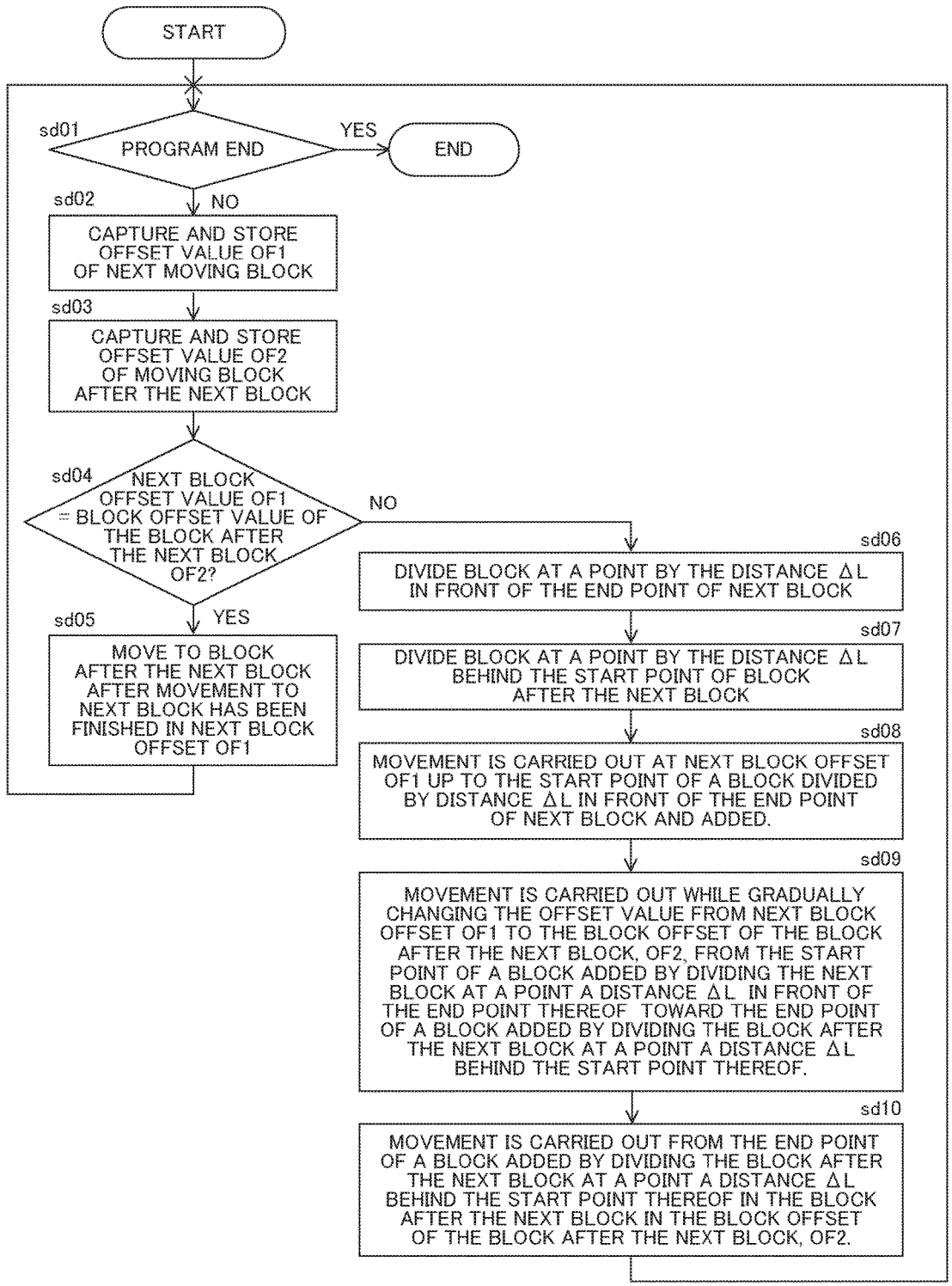
FIG. 28 is a flowchart explaining processing of an embodiment 4.

FIG. 28 is a flowchart of processing of the embodiment 4. Here, FIG. 28 is a flowchart of processing when minute blocks that extend in front of and behind a joint of a block are provided.

[Step sd01] Whether or not a program is finished is determined, and when the program is finished (YES), a process is finished, whereas when the program is not finished (NO), the process goes to step sd02.

[Step sd02] An offset value OFd1 of a next moving block, that is, the next moving block, is captured and stored in a memory. Note that, the next moving block is a block that will be carried out next to a first block that is being carried out at the time.

[Step sd03] An offset value OFd2 of a moving block after the next block, is captured and stored in the memory. Note that, the block after the next block is a block that will be carried out next to the next block that is being carried out at the time after the first block has been carried out.

[Step sd04] Whether or not the next block offset OFd1 is equal to the block offset of the block after the next block, OFd2, is determined, and when they are equal to each other (YES), the process goes to step sd05, whereas when they are not equal to each other (NO), the process goes to step sd06.

[Step sd05] A movement to the block of the block after the next block is carried out after the movement of the next block has been finished in the offset OFd1 of the next block.

[Step sd06] A block is divided at a point by a distance ΔL in front of the end point of the next block.

[Step sd07] The block is divided at a point by a distance ΔL behind the start point of the block after the next block.

[Step sd08] A movement is carried out in the offset OFd1 of the next block up to a start point of a block added by dividing the next block at a point a distance ΔL in front of the end point of the next block.

[Step sd09] A movement is carried out while gradually changing the offset value from offset OFd1 of the next block to the offset OFd2 of the block after the next block from a start point of a block added by dividing the next block at a point a distance ΔL in front of the end point thereof and added toward an end point of a block added by dividing the block after the next block at a point a distance ΔL behind a start point thereof.

[Step sd10] A movement is carried out from an end point of a block added by dividing the block after the next block at a point a distance ΔL behind a start point thereof in the block after the next block in the offset of the block after the next block, OFd2.

Note that, the minute blocks are automatically created not only in front of and behind the connecting point but also a minute block may be created as one block only behind an optional section from the connecting point (in the case, ΔL=0 at step sd06) or as one block only in front of an optional section from the connecting point (in the case, ΔL=0 at step sd07). Thus, when a block is added so that the block does not extend to two blocks, the offset value is gradually changed so that the next block offset OFd1 is set at the start point of the added block and the block offset of the block after the next block, OFd2, is set at the end point thereof. Further, the length ΔL at step sd06 need not be equal to that of ΔL at step sd07.

According to the embodiment 4, a numerical control apparatus of a machine tool for cutting a work by a cutting tool along a machining path including an offset, which includes means configured to add a block that divides, when an offset value instructed in a first front block is different from an offset value instructed in a next rear block in two contact machining path blocks, the two blocks in front of and behind a connecting point of the two blocks in an optional distance, respectively and gradually changes from the offset value instructed in the front block to the offset value instructed in the rear block between a newly divided point of the front block and a newly divided point of the rear block, is configured.

Likewise, a numerical control apparatus of a machine tool for machining a work by a cutting tool along a machining path including an offset, which comprises means configured to add a function block that gradually changes, when an offset value instructed in a first front block is different from an offset value instructed in a next rear block in two contact machining path blocks, a function that gradually changes from the offset value instructed in the front block to the offset value instructed in the rear block between a point made by being divided in front of a connecting point of the two blocks in a travel direction in an optional distance and a start point of a block behind the divided point, is configured.

Likewise, a numerical control apparatus of a machine tool for machining a work by a cutting tool along a machining path including an offset means configured to add a block which gradually changes, when an offset value instructed in a first front block is different from an offset value instructed in a next rear block in two contact machining path blocks, a function that gradually changes from the offset value instructed in the front block to the offset value instructed in the rear block between the end point of the front block and a point made by being divided behind a connecting point of the two blocks in a travel direction in an optional distance.

The invention claimed is:

1. A numerical control apparatus of a machine tool for machining a workpiece by a cutting tool along a machining path including an offset, the numerical control apparatus comprising:
    a unit configured to, when an offset value of the offset of the machining path along which the workpiece is machined instructed in a first front block in two successive contact machining path blocks is different from an offset value instructed in a second rear block in the two successive contact machining path blocks,
    automatically add a block that divides the first front block and the second rear block, wherein the added block is
        (i) from a first point by a first distance in front of a connecting point of the first front block and the second rear block,
        (ii) to a second point by a second distance behind the connecting point, and
    gradually change the offset value, from the offset value instructed in the first front block to the offset value instructed in the second rear block, in the added block between the first and second points,
    wherein the numerical control apparatus is configured to control the machine tool to cut the workpiece along the machining path in accordance with the first front block, the added block, and the second rear block.

2. A numerical control apparatus of a machine tool for machining a workpiece by a cutting tool along a machining path including an offset, the numerical control apparatus comprising:
    a unit configured to, when an offset value of the offset of the machining path along which the workpiece is machined instructed in a first front block in two successive contact machining path blocks is different from an offset value instructed in a second rear block in the two successive contact machining path blocks,
    automatically add a block from a point by a distance in front of a connecting point of the first front block and the second rear block to the connecting point, and
    gradually change the offset value from the offset value instructed in the first front block to the offset value instructed in the second rear block, in the added block
    wherein the numerical control apparatus is configured to control the machine tool to cut the workpiece along the machining path in accordance with the first front block, the added block, and the second rear block.

3. A numerical control apparatus of a machine tool for machining a workpiece by a cutting tool along a machining path including an offset, the numerical control apparatus comprising:
    a unit configured to, when an offset value of the offset of the machining path along which the workpiece is machined instructed in a first front block in two successive contact machining path blocks is different from an offset value instructed in a second rear block in the two successive contact machining path blocks,
    automatically add a block from a connecting point of the first front block and the second rear block to a point by a distance behind the connecting point, and
    gradually change the offset value from the offset value instructed in the first front block to the offset value instructed in the second rear block, in the added block
    wherein the numerical control apparatus is configured to control the machine tool to cut the workpiece along the machining path in accordance with the first front block, the added block, and the second rear block.

* * * * *